United States Patent
Golab et al.

(10) Patent No.: US 8,639,667 B2
(45) Date of Patent: Jan. 28, 2014

(54) GENERATING CONDITIONAL FUNCTIONAL DEPENDENCIES

(75) Inventors: Lukasz Golab, Morris Plains, NJ (US); Howard Karloff, New York, NY (US); Philip Korn, New York, NY (US); Divesh Srivastava, Summit, NJ (US); Bei Yu, Somerville, MA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 786 days.

(21) Appl. No.: 12/380,858

(22) Filed: Mar. 3, 2009

(65) Prior Publication Data

US 2009/0287721 A1    Nov. 19, 2009

Related U.S. Application Data

(60) Provisional application No. 61/067,926, filed on Mar. 3, 2008.

(51) Int. Cl.
*G06F 7/00*    (2006.01)
*G06F 17/00*   (2006.01)
*G06F 17/30*   (2006.01)

(52) U.S. Cl.
USPC ............ 707/690; 707/696; 707/741; 707/792

(58) Field of Classification Search
None
See application file for complete search history.

(56) References Cited

U.S. PATENT DOCUMENTS

2003/0023591 A1*  1/2003  Ma et al. ............................ 707/6
2009/0006302 A1*  1/2009  Fan et al. ......................... 706/48

OTHER PUBLICATIONS

Han et al. "Frequent Pattern Mining: Current Status and Future Directions" Department of Computer Science University of Illinois, 1304West Springfield Ave. Urbana, IL 61801, USAData Min Knowl Disc (2007) pp. 55-86.*
Han et al. "Frequent Pattern Mining: Current Status and Future Directions" Springer Science + Buisness Meda, LLc 2007.*
Bohannon et al. "Conditional Functional Dependencies for Data Cleaning" Yahoo Research, 2007 IEEE.*
Raju et al. "Fuzzy Functional Dependencies and Lossless Join Decomposition of Fuzzy Relational Database Systems" ACM Transactions on Database Systems, vol. 13, No. 2, Jun. 1988, p. 129-166.*
Cong et al. "Improving Data Quality: Consistency and Accuracy" Microsoft Research Asia, VLDB 2007, Sep. 23-28, Vienna, Austria.*
Bravo et al. "Extending Dependencies with Conditions" University of Edinburgh VLDB 2007, Sep. 23-28, Vienna, Austria.*

* cited by examiner

*Primary Examiner* — Sherief Badawi
*Assistant Examiner* — Berhanu Mitiku
(74) *Attorney, Agent, or Firm* — Ronald D. Slusky

(57) ABSTRACT

Techniques are disclosed for generating conditional functional dependency (CFD) pattern tableaux having the desirable properties of support, confidence and parsimony. These techniques include both a greedy algorithm for generating a tableau and, for large data sets, an "on-demand" algorithm that outperforms the basic greedy algorithm in running time by an order of magnitude. In addition, a range tableau, as a generalization of a pattern tableau, can achieve even more parsimony.

1 Claim, 10 Drawing Sheets

FIG. 1

```
GenerateTableau ($D$, $\hat{s}$, $\hat{c}$,):
01  for each tuple $t \in D$ do
02      for each pattern $p \in cube(t)$ do
03          $cover(p) := cover(p) \cup \{t\}$;
04          $(kp(p), ct(p)) += (kp(t), ct(t))$;
05  $F := \emptyset$;
06  for each pattern $p$ do
07      $margSupp(p) := ct(p)$;
08      $con\ f\ (p) := kp(p)/ct(p)$;
09      $F := F \cup \{p\}$;
10  $T := \emptyset$; $cumSupport := 0$;
11  while $F \neq \emptyset$ and $cumSupport < \hat{s}N$ do
12      $p := \arg\max_{x \in F} margSupp(x)$;
13      $F := F \setminus \{p\}$;
14      if $con\ f\ (p) \geq \hat{c}$ then
15          $T := T \cup \{p\}$;  // $p$ selected for tableau
16          $cumSupport += margSupp(p)$;
17          for each remaining $p' \in F$ do
18              $cover(p') := cover(p') - cover(p)$;
19              $margSupp(p') := |\ cover(p')\ |$;
```

FIG. 2

```
GenerateTableau (D, ŝ, ĉ,);
01  for each tuple t ∈ D do
02      for only the null pattern p do
03          cover(p) := cover(p) ∪ {t};
04          (kp(p), ct(p)) += (kp(t), ct(t));
05  F := ∅;
06  for only the null pattern p do
07      margSupp(p) := ct(p);
08      con f (p) := kp(p)/ct(p);
09      F := F ∪ {p};
10  T := ∅; V := ∅; cumSupport := 0;
11  while F ≠ ∅ and cumSupport < ŝN do
12      p := arg max_{x∈F} margSupp(x);
13      F := F \ {p};
14      if con f (p) ≥ ĉ then
15          T := T ∪ {p};
16          cumSupport += margSupp(p);
17          for each remaining p'∈ F do
18              cover (p') := cover (p') - cover (p);
19              margSupp(p') := Σ_{t ∈ cover(p')} ct(t);
20      else  // expand children of p
21          V := V ∪ {p};
22          for each t ∈ cover(p) do
23              for each child pattern c of p using t do
24                  if parents(c) ⊆ V then
25                      determine cover(c) from cover(p);
26                      margSupp(c) := |cover(p)|;
27                      F := F ∪ {c};
```

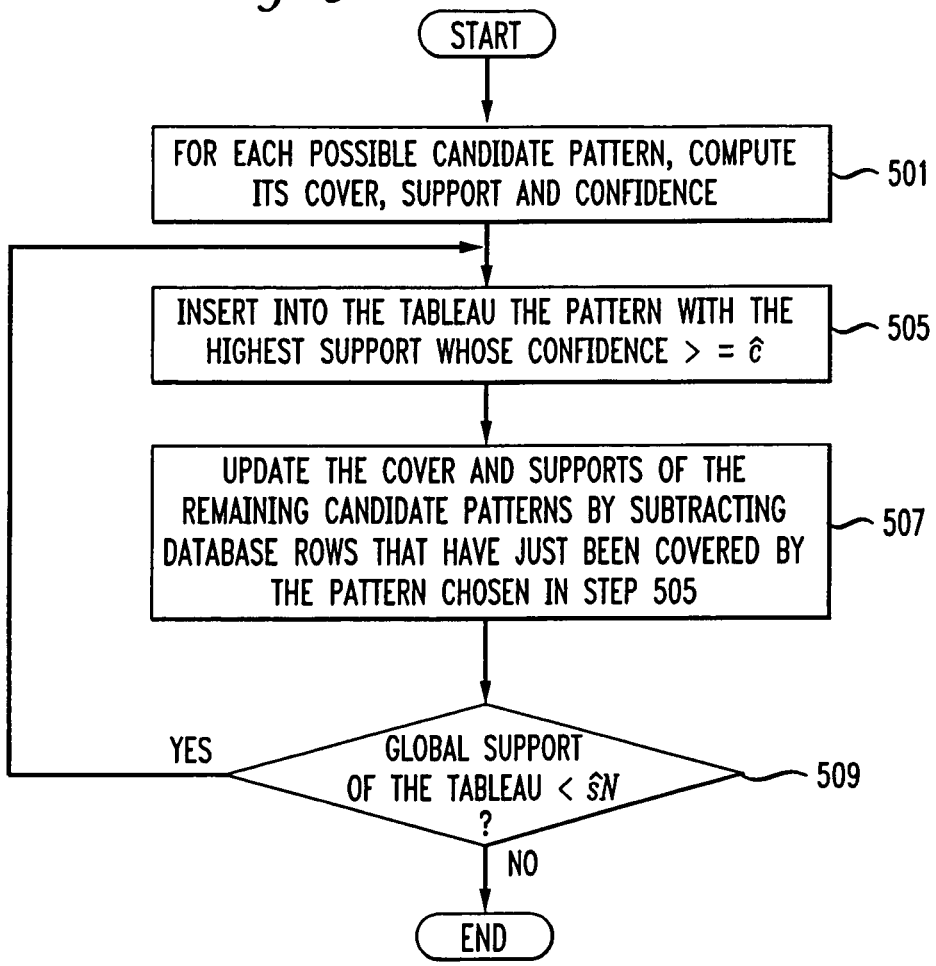

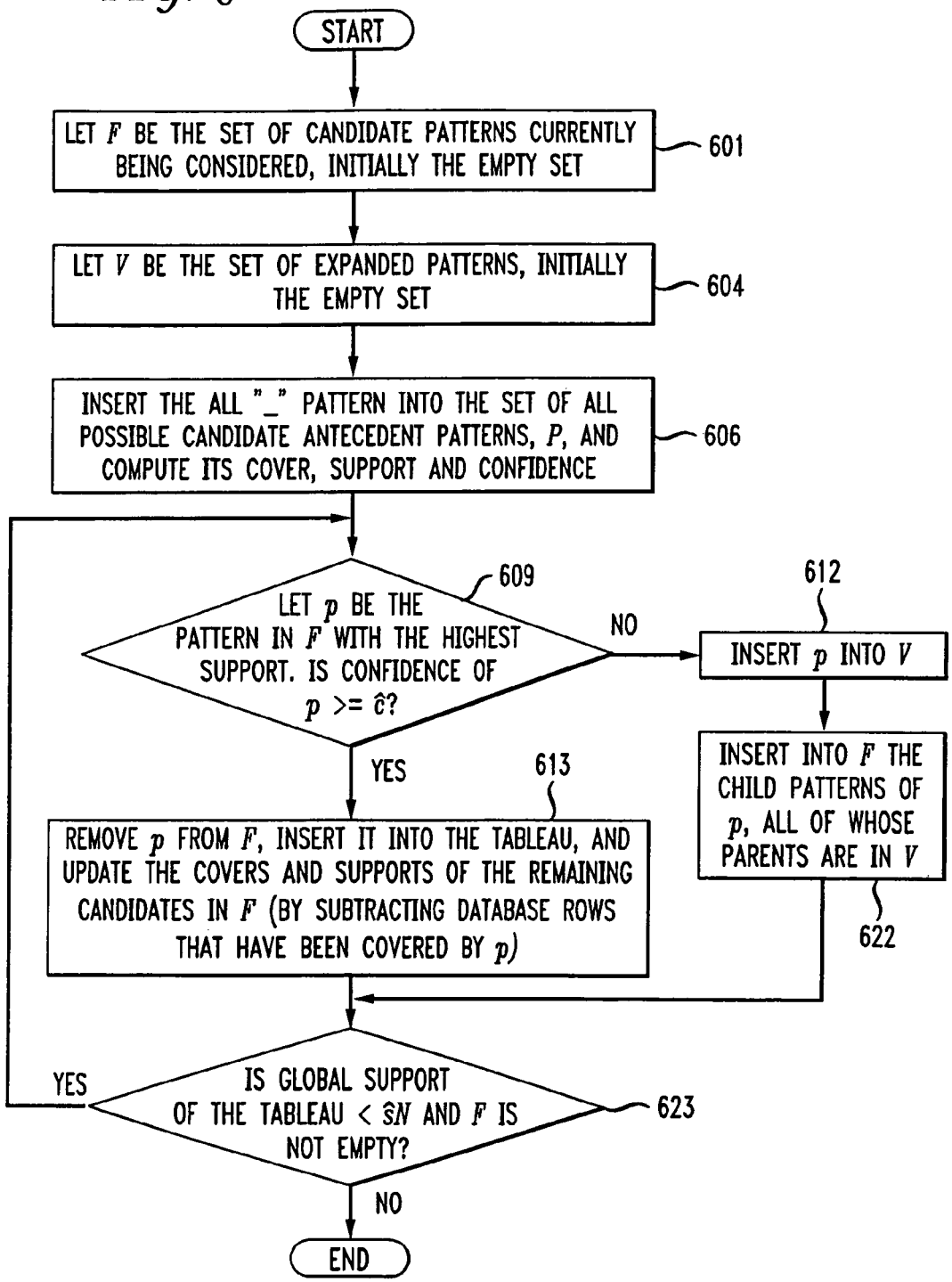

US 8,639,667 B2

GENERATING CONDITIONAL FUNCTIONAL DEPENDENCIES

CROSS-REFERENCE TO RELATED APPLICATION

This application claims the benefit of provisional patent application 61/067,926 filed Mar. 3, 2008, which is hereby incorporated by reference.

BACKGROUND

The present invention relates to the use of conditional functional dependencies (CFDs) to characterize the quality of data in relational schema.

Explaining first the notion of a functional dependency, let X and Y be subsets of a relational schema R. For example, the set of data shown in Table 4—called "SALES"—contains purchase records of an international retailer, with the following schema:

SALES (tid, name, type, vat, country, city)

which means that each record of the schema comprises a 6-tuple having a transaction identifier tid and wherein a product with a given name and type was sold in a given country and city for a given price and charged a given value-added tax (VAT), or vat.

A functional dependency (FD) X→Y asserts that any two tuples that agree on the values of all the attributes in a subset X of the attributes (the antecedent) must agree on the values of all the attributes in a subset Y of the attributes (the consequent). Thus if the attributes in X are "name" "type" and "country" and the attributes in Y are "price" and "vat," the functional dependency (FD) X→Y asserts that any given combination of item name, type and country should have the same price and the same vat. That is, all pairs of tuples with the same antecedent combination should have the same price and vat. Thus if (Smith, book, USA) has ($20, $1), then every other (Smith, book, USA) must have ($20, $1). Violations of FDs indicate inconsistencies in the data. Thus FDs are useful for characterizing data quality, with a fundamental issue being how to discern which tuples satisfy the FD and which do not.

FDs have traditionally been used in schema design and, as such, specify integrity constraints over entire relations. However, many interesting constraints hold conditionally, that is, on only a subset of the relation.

This brings us to the subject of the conditional functional dependencies, or CFDs, which have been proposed as a useful integrity constraint to characterize data quality and identify data inconsistencies.

Suppose that what we are interested in at a given time relative to the integrity of the data is to evaluate the extent to which the records of the table SALES meet both of the following constraints:

I. The records meet the above-noted FD, [name, type, country]→[price, vat], for that subset of records described by either of
1. country=UK and type=clothing
2. country=France and type=book II. All books purchased in France are charged zero vat per French law.

Looking only at the FD is not going to help us in the desired evaluation of the subset of interest because tuples that agree in X but not in Y are considered violations of the FD, even if they do not match the conditions that we care about—in this case the conditions on country and type. Moreover, so-called "dirty" tuples may go unnoticed. For example, if all books purchased in France have the same value of vat and that value is non-zero, the FD is satisfied but the records in question are problematic because the vat on books sold in France is supposed to be zero. Similar problems occur if a relation integrates data from multiple sources, in which case an FD may hold only on tuples obtained from one particular source.

Conditional functional dependencies (CFDs) address the foregoing. A CFD is composed of an embedded FD X→Y plus a so-called "pattern tableau" that defines those tuples that we care about as obeying the FD. As such, a conditional functional dependency is a construct that augments a functional dependency so as to define—by way of the pattern tableau—a subset of tuples on which the underlying FD should hold.

The pattern tableau is such that for any pattern (row) $t_p$ in the pattern tableau, if two tuples have the same values of attributes in X and these values match those in $t_p$, then they must have the same values of attributes in Y and these values must match those in $t_p$. The pattern tableau shown in Table. 1, for example, expresses constraints A and B above.

An underscore in the pattern tableau represents a match-all pattern, so that, for example, a standard FD is equivalent to a CFD with a single all-underscores row in the pattern tableau. Constants in the antecedent restrict the scope of the CFD, whereas constants in the consequent fix the values of the corresponding attributes of all matching tuples. In addition, pairs of tuples that do not match any pattern are not considered violations, even if they agree on the antecedent but not the consequent of the embedded FD.

Existing work on CFDs considered the problems of validating a given CFD on a relation instance, determining consistency and implications of multiple CFDs, and "repairing" the relation so that the given CFD is satisfied. However, these all assume a pattern tableau is supplied. What has not been addressed is how to create useful pattern tableaux—something which is needed to realize the full potential of the CFD construct. Indeed, it is not even obvious what design principles should guide the creation of a pattern tableau.

It is also desirable to be able to automate the process of generating the pattern tableau inasmuch as users may not be aware of all the specific constraints that hold over a given relation, this being due, for example, to schema and/or data evolution.

These are among the problems to which the present invention is directed

SUMMARY

In accordance with an aspect of our work, we have developed algorithms for deriving such a pattern tableau from the data at hand given desired support and confidence thresholds.

In accordance with another aspect of our work, we have recognized that it is useful, and desirable, to be able to concisely summarize tuples causing the bulk of violations. This aspect of our work thus encompasses the notion of creating what we refer to as fail tableaux for a given CFD, wherein a fail tableau comprises patterns describing many of the CFD violations. Our work also encompasses an algorithm for creating the fail tableaux, analogously composed of concise patterns having low confidence (many violations).

In accordance with another aspect of our work, a CFD is "tuned" by adding or removing attributes from the underlying FD, such as by adding attributes to the antecedent or removing attributes from the consequent. Advantageously, such tuning may increase—and definitely will not decrease—the CFD's "confidence" while maintaining the same support.

In accordance with another aspect of our work, even greater parsimony can be achieved using what we refer to as a "range tableau." This is a generalization of the pattern tableau that can be generated when there are ordered attributes.

DRAWINGS

FIG. 1 shows pseudocode implementing our greedy algorithm for generating pattern tableaux;

FIG. 2 shows pseudocode implementing our "on-demand" algorithm for generating pattern tableaux;

FIGS. 4(a) through 4(h)—also referred to herein collectively as FIG. 4—are graphs comparing the performance of our greedy algorithm to our "on-demand" algorithm;

FIG. 5 is a flowchart of the greedy algorithm;

FIG. 6 is a flowchart of our "on-demand" algorithm; and

Figure 7:
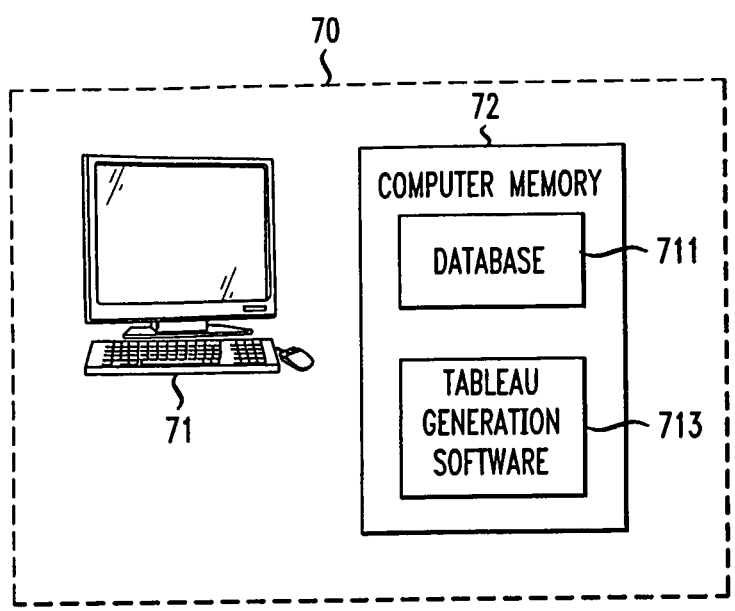

FIG. 7 shows a system in which the present invention is illustratively implemented.

DETAILED DESCRIPTION OF ILLUSTRATIVE EMBODIMENTS

Overview Description

Tableau Generation

It may be argued that a good pattern tableau should contain patterns that hold exactly (with no violations). However, real data typically include errors and noise; therefore, such patterns, if they exist, may match very few tuples. On the other hand, a trivial pattern tableau containing a single all-underscores pattern matches the entire relation, but there may be many violations. Furthermore, a pattern tableau should be concise so that it is easy to interpret and allows operations such as detecting violations to be performed efficiently. Thus, it is desirable to have a set of pattern tableau patterns that is a) relatively "parsimonious," meaning that the number of patterns is relatively small, b) has relatively high "support," meaning that many tuples match at least one row, and has high "confidence," meaning that there are relatively few violations.

In accordance with an aspect of our work, we have developed algorithms for deriving such a pattern tableau from the data at hand given desired support and confidence thresholds.

One of our algorithms, which we call our greedy algorithm, is shown in the flowchart of FIG. 5, comprising steps 501, 505, 507 and 509. The other of our algorithms, which we call our "on-demand" algorithm, is shown in the flowchart of FIG. 6, comprising steps 601, 604, 606, 609, 613, 617. 622 and 623. The underpinnings of these algorithms, as well as definitions and explanations of the various terms used in the flowchart are all set forth hereinbelow. With one possible, exception the words of this flowchart, taken in combination of the description below of the greedy algorithm, are self-explanatory and need not be described in further detail. That exception is a definition of "child pattern" and "parent" as used in step 622. A "child pattern of p is pattern in which we replace any "_" with any constant that appears in the database, and a parent, or parent pattern, of p is a pattern in which we replace any constant with a "_".

FIG. 7 shows a system 70 in which the present invention is illustratively implemented. The system includes a computer or workstation 71 having a hard disk or other bulk storage memory 72. Among the information stored in memory 72 is a database 711 containing data records and a body of software, denoted as tableau generating software 813, which implements the invention as described herein.

Fail Tableaux

Violations of constraints often represent interesting events, and in accordance with another aspect of our work, we have recognized that it is useful, and thus desirable, to be able to concisely summarize tuples causing the bulk of violations. This aspect of our work thus encompasses the notion of creating fail tableaux for a given CFD, wherein a fail tableau comprises patterns describing many of the CFD violations, as well as encompassing an algorithm for creating the violation pattern tableau, analogously composed of concise patterns having low confidence (many violations). For example, suppose that in conjunction with the tableau in Table 4 we have computed the fail tableau shown in Table 2. We now know which tuples satisfy the embedded FD, and that the FD is violated mainly by purchases in the USA (possibly because some cities set their own sales tax (regarded as equivalent to vat for present purposes) and purchases of electronics (possibly because the prices of electronics dropped over time).

Algorithms for generating a fail tableau can be similar to the greedy or "on-demand" algorithms shown in FIGS. 5 and 6 for the conventional type of tableau (which we refer to as a "hold" tableau) that encompasses patterns that obey, rather than violate, the FD. Converting either of those algorithms to generate a fail tableau involves a) changing steps 505 and 609 to determine whether the pattern under investigation is less than or equal to ĉ and b) using in those steps confidence values of the patterns would be after adjusting them based on the hold tableau, rather than using the original confidence values.

Tuning

In accordance with another aspect of our work, a CFD is "tuned" by adding or removing attributes from the underlying FD, such as by adding attributes to the antecedent or removing attributes from the consequent. Advantageously, such tuning may increase—and definitely will not decrease—the CFD's "confidence" while maintaining the same support.

Thus suppose that the pattern tableau in Table 1 has low confidence. This may indicate data quality issues in the subset of the relation matched by the pattern tableau, or that the embedded FD does not reflect the semantics of the data. In either case, it is useful to "try out" slightly modified FDs which impose weaker assertions. In particular, adding attributes to the antecedent or removing attributes from the consequent may increase (definitely will not decrease) the confidence of the CFD while maintaining the same support. For example, adding city to the antecedent of the CFD in our motivating example produces

[name, type, country, city]→[price, vat]

and does not affect the support if the new column city of the pattern tableau is set to all-underscores. This modification is appropriate if violations of the original CFD are caused by different cities in the same country setting different prices and/or vat rates on the same products. Similarly, removing price from the consequent yields

[name, type, country]→[vat]

and the price column is also removed from the pattern tableau. This modification eliminates any violations caused by the same products being sold at different prices. Again, support does not change since no constants were added to the antecedent of any pattern.

It is not obvious which attributes to adjust in order to increase the confidence of the pattern tableau. Therefore, it may be necessary to compute the confidences of multiple modified FDs. Rather than performing these computations separately for each modified FD, we give an algorithm that jointly computes these confidences.

Range Tableaux

In accordance with another aspect of our work, even greater parsimony can be achieved using what we refer to as a "range tableau." This is a generalization of the pattern tableau that can be generated when there are ordered attributes.

A range tableau can be generated via an extension of the "on-demand" algorithm. In fact, all of the pseudocode of FIG. 2 remains the same; the only change is in how to expand patterns that fail the confidence threshold. The children and parents that are considered in step 622 are determined in this case in a manner described hereinbelow.

Theoretical Underpinnings

1 Introduction

Let X and Y be subsets of a relational schema R. A functional dependency (FD) X→Y asserts that any two tuples that agree on the values of all the attributes in X (the antecedent) must agree on the values of all the attributes in Y (the consequent).

FDs have traditionally been used in schema design and, as such, specify integrity constraints over entire relations. However, many interesting constraints hold conditionally, that is, on only a subset of the relation. For instance, consider table Sales, storing purchase records of an international retailer, with the following schema:

Sales(tid, name, type, price, tax, country, city)

Each Sales tuple represents a transaction, uniquely identified by tid, where a product with a given name and type was sold in a given country and city for a given price and charged a given tax. Suppose the semantics of the data are such that

[name, type, country] →[price, tax]

but only if type=clothing, (country=FRance and type=book), or country=UK; in addition, suppose all books purchased in France are charged zero tax. FDs cannot express these semantics because they must hold over a whole relation and do not bind specific values to the consequent attributes. However, conditional semantics are common in real data; e.g., if a relation integrates data from multiple sources, then a constraint may hold only on tuples obtained from one particular source.

Conditional functional dependencies (CFDs) have recently been proposed to express the above types of constraints [4, 5, 9]. A CFD is composed of an embedded FD X→Y plus a pattern tableau that determines which tuples must obey the FD. Table 1 illustrates a tableau corresponding to our example on the Sales table. For any pattern (row) $t_p$ in the tableau, if two tuples have the same values of attributes in X and these values match those in $t_p$, then they must have the same values of attributes in Y and these values must match those in $t_p$. Here a '—' denotes the wildcard (match-all) pattern, meaning that a standard FD is equivalent to a CFD with a single all-wildcards row in the pattern tableau. Observe that constants in the antecedent restrict the scope of the CFD,

TABLE 3

Example fail tableau for the FD [name, type, country] → [price, tax]

| name | type | country | price | tax |
|---|---|---|---|---|
| — | — | USA | — | — |
| — | electronics | — | — | — | than patterns. We describe how to extend the on-demand algorithm to efficiently generate range tableaux.

Finally, we experimentally evaluate the proposed solutions using two real data sets: sales data containing purchase transactions from an on-line retailer, and router configuration data from a large Internet Service Provider (ISP). The results demonstrate significant performance benefits of the on-demand algorithm—in some cases, it outperforms the basic greedy algorithm in running time by more than an order of magnitude—as well as the utility of deriving good hold and fail tableaux. In addition, we show that the generated tableaux routinely have optimal or near-optimal sizes (well below the approximation upper-bound), and are robust to taking different samples of the data. Finally, we demonstrate that range tableaux can be effectively leveraged on ordered attributes to further provide conciseness compared to standard pattern tableaux.

The goal of this work is to realize the full potential of CFDs as compact summaries of the semantics of large data sets. As such, this paper is related to previous work on discovering the semantics of relational data, such as mining standard FDs [14, 17], algebraic constraints [6], correlations [15], and association rules [2]. However, automatic generation of pattern tableaux has not been studied. Also, note that while the generated tableaux may point out potential data quality problems, how to resolve those problems is not the subject of this paper. In particular, we do not advocate using the generated tableaux as an integrity enforcement mechanism and dropping all the tuples that do not match a tableau.

The remainder of this paper is organized as follows. Section 2 reviews CFDs, and defines tableau support and confidence. In Section 3, we discuss the complexity of deriving interesting tableaux. Section 4 presents an efficient tableau generation algorithm and Section 5 describes extensions to generate fail and range tableaux. Section 6 summarizes the experimental results, Section 7 reviews related work, and Section 8 concludes the paper.

2 Definitions 2.1 FDs and CFDs

Let R be a relational schema on attributes $A_1, A_2, \ldots, A_l$ with instance dom(R)=$\{t_1, t_2, \ldots, t_N\}$. We shall abuse notation and let dom(X) refer to $\{t_1[X], \ldots, t_N[X]\}$, the set of tuples projected on X⊂R. For X,Y⊂R, let dom(XY) denote $\{xy: \exists t_i \in dom(R) \text{ such that } (t_i[X]=x) \cap (t_i[Y]=y)\}$. A functional dependency X→Y is said to hold when ∀i, j, if $t_i[X]=t_j[X]$ then $t_i[Y]=t_j[Y]$, where ⊂R is a set of attributes referred to as the antecedent and Y C $\overline{R}$ is a set of attributes referred to as the consequent.

A Conditional Functional Dependency (CFD) φ on R is a pair (R:X→Y, T), where (1) X→Y is a standard FD, referred to as the embedded FD; and (2) T is a pattern tableau with all attributes from X and Y, where for each row $t_p \in T$ and each attribute A∈X∪Y, $t_p[A]=a$, for some a∈dom(A), or $t_p[A]='—'$. To denote that a tuple t∈dom(R) satisfies a particular row $t_p$ of tableau T, we use the symbol '≍'. We write t[S] ≍ $t_p[S]$ iff for each attribute A of S, either t [A]=$t_p[A]$ or $t_p[A]='—'$. That is, t matches tableau row $t_p$ if t agrees with $t_p$ on all the non-wildcard attributes of $t_p$. We say that a relation instance dom(R) (exactly) satisfies a CFD φ iff ∀$t_i, t_j \in dom(R)$ and ∀$t_p \in T$, if $t_i[X]=t_j[X] ≍ t_p[X]$ then $t_i[Y]=t_j[Y] ≍ t_p[Y]$.

A violation of a standard FD occurs when two tuples agree on all the attributes in the antecedent but not the consequent. Violations of CFDs come in two types. A single-tuple violation (STV) occurs if an individual tuple matches the antecedent, but not the consequent, of some pattern. Formally, a STV occurs if t∈dom(R) and $t_p \in T$ such that $t[X] ≍ t_p[X]$ but $t[Y] \not\asymp t_p[Y]$. Note that for an STV to occur, T must have at least one row with at least one non-wildcard entry in the consequent (e.g., row 2 in Table 1). A multi-tuple violation (MTV) occurs if $t_i, t_j \in dom(R)$ and $\exists t_p \in T$ such that $t_i[X]=t_j[X] ≍ t_p[X]$ but $t_i[Y] \neq t_j[Y]$. Note that the two conflicting tuples must match the antecedent of at least one pattern.

2.2 Support and Confidence

Given a CFD $\phi=(R:X\to Y,T)$ and a relation instance dom(R), let cover(p) be the set of tuples matching pattern p:

$$\text{cover}(p)=\{t:(t\in\text{dom}(R))\wedge(t[X]\asymp p[X])\}.$$

We define the local support of p as the fraction of tuples "covered" by (i.e., match the antecedent of) p, and the global support of T as the fraction of tuples covered by at least one of its patterns:

$$\text{local\_support}(p) = \frac{|\text{cover}(p)|}{N}$$

$$\text{global\_support}(T) = \frac{1}{N}\left|\bigcup_{t_p\in T}\text{cover}(t_p)\right|.$$

Observe that these definitions only reference the antecedent since only those attributes can restrict the scope (coverage) of a CFD.

We also require a measure ("confidence") that reflects the degree to which the data satisfy the CFD. Several definitions have been proposed for standard FDs, involving the computation of the entropy of dom(X) and dom(XY) [10, 13]; the probability that a randomly drawn pair of tuples agreeing on X also agree on Y [7, 18]; the number of distinct values in dom(X) versus the number of distinct values in dom(XY) [15]; and the smallest number of tuples that would have to be removed from the relation in order to eliminate all violations [14, 17, 18, 19]. We extend the last definition as it is not clear how to modify the other three to account for STVs. Also, this edit-distance based measure is natural and has been widely studied in the context of standard FDs.

Let keepers(p) denote the tuples covered by p, after removing the fewest tuples needed to eliminate all violations (i.e., disagreement in the consequent):

$$\text{keepers}(p)=\cup_{x\in\text{dom}(X)}\{t:t[XY]\asymp p[XY]=xy_x\}$$

where, for all $x\in\text{dom}(X)$, $y_x=\arg\max_y|\{t:xy=t[XY]\asymp[XY]\}|$. That is, for each distinct binding x of the antecedent attributes, we retain tuples that agree on the most frequently occurring consequent binding $y_x$ matching p[Y], and eliminate those that do not. Then:

$$\text{local\_confidence}(p) = \frac{|\text{keepers}(p)|}{\text{cover}(p)}$$

$$\text{global\_confidence}(T) = \frac{\left|\bigcup_{t_p\in T}\text{keepers}(t_p)\right|}{\left|\bigcup_{t_p\in T}\text{cover}(t_p)\right|}.$$

Given the above definitions of support and confidence, an FD has a global support of 1, whereas a CFD has a global support of s, where $0\leq s\leq 1$. Furthermore, an exact FD or CFD is required to hold with a global confidence of 1, whereas an approximate FD or CFD holds with global confidence c, where $0\leq c\leq 1$.

2.3 Example

Let us compute the support and confidence of the CFD from Table 1 over an instance of the Sales relation shown in Table 4 (attributes not used in this example have been omitted). First, consider the pattern (—, —, UK|—, —); we use '|' to separate the antecedent and consequent. We need to determine which tuples it covers and, for each distinct antecedent, compute the sizes of its keepers and cover sets. Since distinct antecedent values are associated with mutually disjoint sets of tuples, we simply sum over these to compute the sizes for the covering pattern. Table 5 displays the 7 tuples covered by ((—, —, UK(—, —), grouped on the antecedent, and shows the tuple with tid 16 in boldface to indicate that removing it would eliminate all violations (i.e., the other tuples are the keepers). Hence, the local support of this pattern is 7/20 and its local confidence is 6/7. Similarly, the local support of (—, clothing, —|(—, —) is 7/20 and its local confidence is 1. The local support of (—, book, France|—, 0), is 5/20 and its local confidence is 4/5 (the tuple with tid=3 causes a STV).

Now, the global support of the tableau is 15/20 as the only tuples that do not match at least one pattern are those with tids of 6, 7, 18, 19 and 20. Note that the global support is smaller than the sum of the three local supports since some tuples match more than one pattern. The global confidence is $$\frac{13}{15} = 0.87.$$

It is worth pointing out that using the tableau with a single all-wildcards pattern yields higher support (of 1) but lower global confidence $$\left(\text{of } \frac{15}{20} = 0.75\right).$$

Finally, we define the marginal_local_support of a pattern p with respect to an existing tableau T by considering only those tuples which have not already been covered by some pattern in T, that is, |cover(p)−cover(T)|/N, where cover(T)= $\cup_{t_p\in T}\text{cover}(t_p)$; marginal_local_confidence is defined similarly. For example, the marginal local support of the pattern (—, DVD, —|—, —) is 3/20, since its local support is 6/20, but three tuples with type=DVD (those with tids of 15, 16, and 17) already match the third row of the existing tableau. Its marginal local confidence is 1/3.

TABLE 4

Instance of Sales relation

| tid | name | type | country | price | tax |
|---|---|---|---|---|---|
| 1 | Harry Potter | book | France | 10 | 0 |
| 2 | Harry Potter | book | France | 10 | 0 |
| 3 | Harry Potter | book | France | 10 | 0.05 |
| 4 | The Lord of the Rings | book | France | 25 | 0 |
| 5 | The Lord of the Rings | book | France | 25 | 0 |
| 6 | Algorithms | book | USA | 30 | 0.04 |
| 7 | Algorithms | book | USA | 40 | 0.04 |
| 8 | Armani suit | clothing | UK | 500 | 0.05 |
| 9 | Armani suit | clothing | UK | 500 | 0.05 |
| 10 | Armani slacks | clothing | UK | 250 | 0 |
| 11 | Armani slacks | clothing | UK | 250 | 0 |
| 12 | Prada shoes | clothing | USA | 200 | 0.05 |
| 13 | Prada shoes | clothing | USA | 200 | 0.05 |
| 14 | Prada shoes | clothing | France | 500 | 0.05 |
| 15 | Spiderman | DVD | UK | 19 | 0 |
| 16 | Star Wars | DVD | UK | 29 | 0 |
| 17 | Star Wars | DVD | UK | 25 | 0 |
| 18 | Terminator | DVD | France | 25 | 0.08 |
| 19 | Terminator | DVD | France | 25 | 0 |
| 20 | Terminator | DVD | France | 20 | 0 |

TABLE 5

Tuples covered by pattern (—, —, UK|—, —)

| tid | name | type | country | price | tax |
|---|---|---|---|---|---|
| 8 | Armani suit | clothing | UK | 500 | 0.05 |
| 9 | Armani suit | clothing | UK | 500 | 0.05 |
| 10 | Armani slacks | clothing | UK | 250 | 0 |
| 11 | Armani slacks | clothing | UK | 250 | 0 |
| 15 | Spiderman | DVD | UK | 19 | 0.06 |
| 16 | Star Wars | DVD | UK | 29 | 0 |
| 17 | Star Wars | DVD | UK | 25 | 0 |

3 Tableau Generation Problem

We now formalize the problem of generating a good pattern tableau. The input to our problem is a relation instance and a standard FD that does not exactly hold on the data (else we would not need a CFD). Optionally, the FD may be known to hold over some patterns which can be supplied as input; here, we ignore such patterns and assume the tableau to be initially empty. The FD could be given (the semantics of the application domain may suggest natural dependencies, e.g., [country=France]→[tax=0]) or automatically found using an algorithm for discovering approximate FDs (e.g., [14, 17]); how to find this initial FD is outside the scope of this paper. Our problem is to generate a tableau that will allow the FD to hold conditionally on the data (i.e., as a CFD) with higher confidence. Note that there are inherent limitations on how much a CFD can improve over its embedded FD. For example, if the FD holds with only 60% confidence, then no subset with at least 75% global support can possibly allow the FD to hold with more than 80% confidence. In general, a tableau with global support s can attain no more than min{1, c/s} global confidence using an embedded FD with confidence c.

Moreover, we wish to find a parsimonious set of patterns. This will provide a more semantically meaningful tableau using general, and thus more interesting, patterns (due to their higher supports) rather than spurious ones. It will also enable faster validation of the CFD on other instances of the relation.

Given a relation schema R and a CFD $\phi=(R: X \rightarrow Y, T)$, we say that dom(R) is $(\hat{s}, \hat{C})_{gg}$-satisfied by $\phi$ iff global_support(T)$\geq \hat{s}$ and global_confidence(T)$\geq \hat{c}$. We say that dom(R) is $(\hat{s},\hat{c})_{gl}$-satisfied by $\phi$ iff global_support(T)$\geq \hat{s}$ and $t_p \in T$, local_confidence($t_p$)$\geq \hat{c}$. Note that the local confidence constraints on $t_p$ do not provide any (useful) guarantees on the global confidence for the entire tableau T, unless the local confidence of each pattern is 1, in which case the global confidence is also 1. Both sets of constraints are desirable in their own right. For instance, one appealing property of a local confidence threshold is that each and every pattern is guaranteed to be "good" (above $\hat{c}$). On the other hand, using the global confidence threshold may lead to a smaller tableau for some fixed level of global support because there are more candidate patterns. In addition, one may wish to impose a local support threshold. This can be handled in the same way as local confidence but, for ease of exposition, we do not discuss it further here.

Definition 1 The tableau generation problem with global support $\hat{s}$ and global confidence $\hat{c}$ is, given an FD R:X→Y on a relation schema R with instance dom(R), find a pattern tableau T of smallest size such that the CFD (R:X→Y,T) is $(\hat{s}, \hat{c})_{gg}$-satisfied, if one exists, and to return "infeasible" otherwise.

Unfortunately, this problem is not only NP-complete but also provably hard to approximate well.

Proposition 1 If there are a polynomial-time algorithm A and a constant $\epsilon > 0$ such that, for all N and R such that |dom(R)|=N, A returns a tableau of size at most $N^{1/2-\epsilon}$ times the optimal size whenever the CFD can be $(\hat{s}, \hat{c})_{gg}$-satisfied, then P=NP We give the proof in the appendix, where we also prove that determining if a tableau exists, of any size, such that the CFD is $(\hat{s}, \hat{c})_{gg}$ satisfied, is solvable in polynomial time.

Definition 2 The tableau generation problem with global support $\hat{s}$ and local confidence $\hat{c}$ is, given an FD R: X→Y on a relation R with instance dom(R), to find a pattern tableau T of smallest size such that the CFD (R:X→Y, T) is $(\hat{s},\hat{c})_{gl}$-satisfied, if one exists, and to return "infeasible" otherwise.

Determining if there is any pattern tableau, of any size, such that the CFD (R:X→Y,T) is $(\hat{s},\hat{c})_{gl}$-satisfied, is solvable in polynomial time. (Without loss of generality one can assume that all the antecedents in T are fully instantiated and all the consequents are wildcards. Discard all database rows whose local confidence falls below $\hat{c}$. A feasible tableau exists if and only if the remaining database rows cover a fraction of $\hat{s}$, or more, of the relation.) However, the generation problem is NP-complete.

Proposition 2 The tableau generation problem with global support and local confidence is NP-complete and NP-hard to approximate to within any constant less than 34/33.

Proof. We exhibit a polynomial-time reduction from VERTEX COVER IN TRIPARTITE GRAPHS, which is not only NP-Complete but which cannot be approximated to within any constant smaller than 34/33 [3]. Let G be a tripartite graph with given vertex partition (A, B, C) having, say, m edges. Denote the vertices of A, B and C as $a_i$, $b_j$ and $c_k$, respectively. Create five new distinct constants d, d', x, y, z which are not vertices of G. Build a database with schema (A, B, C, D) satisfying a CFD with embedded FD ABC D as follows. Given edges e of G, populate the database such that (1) if e={$a_i$, $b_j$}, add row ($a_i$, $b_j$, z|d); (2) if e={$a_i$, $c_k$}, add row ($a_i$, y, $c_k$|d); and (3) if e={$b_j$, $c_k$}, add row (x, $b_j$, $c_k$|d); where '|' emphasizes that d is the value in the consequent. Finally, add two more rows: (x, y, z|d) and (x, y, z|d'). Define the target global support to be m (the number of edges of G) and the local confidence target to be 1. This completes the reduction.

Clearly, the reduction can be done in polynomial time. Also note that there must be some feasible tableau: just take all patterns ($a_i$, —, —|—), (—, $b_j$, —|—) (—, —, $c_k$|—). We must show that the size of the smallest tableau meeting the global support and local confidence bounds equals the size of the smallest vertex cover.

Consider any tableau that is $(\hat{s}, \hat{c})_{gl}$-satisfied. We first prove that the feasible solution can be assumed to contain only patterns of the form ($a_i$, —, —|—), (—, $b_j$, —|—), or (—, —, $c_k$|—), and thus corresponds in an obvious way to a set of vertices in G. We may assume that each tableau pattern matches at least one database row. Consider a tableau pattern p (assume that its consequent is '—'). Pattern p cannot match any tuples with antecedent (x, y, z), otherwise its local confidence would be less than 1 due to the presence of (x, y, z|d) and (x, y, z|d'). Hence, p matches at least one other row in the database. Suppose it matches the row ($a_i$, $b_j$, z|d), the other two cases of matching ($a_i$, y, $c_k$|d) or (x, $b_j$, $c_k$|d) being symmetric. This means that the first component of p is either $a_i$ or '—', its second component is either $b_j$ or '—', and its third component is either z or '—'. If the first two components are '—', then we have a contradiction, for then we match (x, y, z|d) and (x, y, z|d') and thus the confidence is less than 1. So let us assume by symmetry that the first component is $a_i$. Now replace that pattern p by p'=($a_i$, —, —|—). The new pattern covers at least as many database rows as the previous one, and its local confidence is still 1.

By repeating this process, we can build a new tableau, of the same size or smaller, all of whose patterns satisfy the local confidence bound and whose overall support is at least as large; hence, the overall support is m. Furthermore, each pattern corresponds to a vertex in a natural way. Since x, y, z appear nowhere in the tableau, to get support m, for each edge $\{a_i, b_j\}$, we must have chosen either $(a_i, —, —|—)$ or $(—, b_j, —|—)$ for the tableau; that is, we must have chosen one of the two vertices covering the edge $\{a_i, b_j\}$. By symmetry, similar statements apply for edges $\{a_i, c_k\}$ and $\{b_j, c_k\}$. Hence, we have a vertex cover whose size is at most the size of the tableau. Therefore, the size of the smallest vertex cover is at most the size of the smallest tableau.

Given a vertex cover A'∪B'∪C', A' ⊂ A, B' ⊂ B, C' ⊂ C, the tableau with patterns $(a_i, —, —|—)$ for all $a_i \in \overline{A}$, $(—, b_j, —|—)$ for all $b_j \in B$, and $(—, —, c_k|—)$ for all $c_k \in C$ satisfies the local confidence and global support constraints and has the same size as the vertex cover. Hence the size of the smallest tableau is at most the size of the smallest vertex cover.

It follows that the minimum size of a tableau equals the minimum size of a vertex cover. Hence, tableau minimization with a local confidence constraint is NP-complete and NP-hard to approximate to within any constant less than 34/33.

Fortunately, unlike the tableau generation problem with global confidence, this problem admits a reasonable approximation. We describe one such approximation algorithm in the next section.

4 Approximation Algorithm

In this section, we give a simple reduction of the problem defined in Definition 2 of Section 3 to a variant of SET COVER, present an efficient implementation of a greedy approximation algorithm for our setting, and propose a faster on-demand algorithm. Here, we consider pattern antecedents and assume the consequents have wildcards in each attribute; in Section 5.1 we describe how to bind constants in the consequent.

4.1 Preliminaries

We define cube(t)=$\{p: t \asymp p\}$ to denote the set of tuples obtained from t by replacing constants with '—' in all possible ways. For example, if X=(A, B, C) and (a, b, c)∈dom(X), then cube(a, b, c)={(—, —, —), (a, —, —), (—, b, —), (—, —, c), (a, b, —), (a, —, c), (—, b, c), (a, b, c)}. This is the set of candidate patterns covering all tuples with antecedent values (a, b, c). Let cube(S) denote the set of tuples $\cup_{t \in S}$ cube(t). Given an embedded FD X→Y, we assume that we have a table D containing all the values in dom(X), i.e., the distinct wildcard-free antecedent patterns.

TABLE 1

Example pattern tableau for the FD [name, type, country] → [price, tax]

| name | type | country | price | tax |
|---|---|---|---|---|
| — | clothing | — | — | — |
| — | book | France | — | 0 |
| — | — | UK | — | — | whereas constants in the consequent fix the values of the corresponding attributes of all matching tuples. Also, note that pairs of tuples whose antecedent attributes do not match any pattern do not violate the CFD, even if they agree on the antecedent but not the consequent of the embedded FD.

Existing work on CFDs considered the problems of validating a given CFD on a relation instance [4], determining consistency and implications of multiple CFDs [4, 5], and "repairing" the relation so that the given CFD is satisfied [9]. However, these all assume a pattern tableau is supplied, and what has not been addressed is how to create useful tableaux. In fact, it is not even obvious what design principles should guide the creation of a tableau. Clearly, automating this process is necessary as users may not be aware of all the specific constraints that hold over a given relation due to schema and/or data evolution. These are exactly the problems we study in this paper.

Our first contribution is defining the problem of optimal pattern tableau generation based on natural criteria. It might seem that a good tableau should choose patterns to maximize the number of tuples matching the embedded FD while not allowing any violations. However, real data typically include errors and noise; therefore, such patterns, if they exist, would match only a small fraction of the data. On the other hand, a tableau matching the entire relation (e.g., containing a single all-wildcards pattern) may identify too many exceptions to be semantically useful. Clearly, the right strategy lies somewhere between these two extremes. We argue that a good tableau should apply to at least some minimal subset of the data and should allow some of these tuples to cause violations, but only a bounded number. Furthermore, a tableau should be concise so that it captures the semantics of the data. For example, the tableau from Table 1 is preferable to that shown in Table 2, where the pattern (—, book, France, —, 0) is replaced with a set of patterns that enumerate all books sold in France. Thus, we seek a small set of tableau patterns with both high support (many tuples should match) and high confidence (few exceptions).

Our second contribution is a study of the complexity of the tableau generation problem. We Each entry in D is also assumed to store the corresponding sizes of the cover and keepers sets, denoted ct and kp, respectively. Finally, let K=|X| and n=|dom(X)|≤N.

4.2 Greedy Algorithm

Let P be cube(dom(X)), i.e., the set of all possible candidate antecedent patterns, with elements p. We take local confidences into account by eliminating patterns p having local-confidence(p)<ĉ. Finding a collection of patterns whose cover sets include at least ŝN tuples from dom(R) will yield a tableau satisfying the global support threshold. Therefore, finding a minimum size tableau meeting both the global support and local confidence constraints is an instance of PARTIAL SET COVER. More precisely, we use a variant where the set elements are weighted by their ct-values. This is different from a weighted set cover. Although this problem is NP-complete, there is a well-known greedy polynomial-time approximation algorithm for it—always choose the set that covers the most elements that have not yet been covered [16]. Other approximation algorithms for PARTIAL SET COVER exist (see [1]) but we do not consider them here.

TABLE 2

Excerpt from a sub-optimal tableau for the FD [name, type, country] → [price, tax]

| name | type | country | price | tax |
|---|---|---|---|---|
| — | clothing | — | — | — |
| — | — | UK | — | — |
| Harry Potter | book | France | — | 0 |
| The Lord of the Rings | book | France | — | 0 |
| Le Petit Prince | book | France | — | 0 |
| ... | ... | ... | ... | ... | show that generating a parsimonious tableau that simultaneously exceeds specified support and confidence constraints is NP-complete and that no good approximation algorithm exists. We also show that generating an optimal tableau where each pattern on its own exceeds the specified confidence threshold reduces to an instance of PARTIAL SET COVER, which is NP-complete but approximable in polynomial time. Thus, a greedy algorithm may be used to generate tableaux whose size is within a logarithmic factor of an optimal solution.

Third, we propose a more efficient version of the greedy algorithm for our problem instance. The number of candidate patterns (with or without wildcards) may be very large, so the idea is to dynamically expand the set of patterns considered "on-demand" rather than to pre-compute the full set of candidates. We believe this optimization to the greedy set cover algorithm is more broadly applicable than just to our problem.

Our fourth contribution is based on the observation that violations of constraints often represent interesting events [8]. Hence, in addition to discovering hold tableaux that identify the context in which the embedded FD holds, one may also want to generate fail tableaux that concisely summarize tuples causing the bulk of violations. We thus formulate the problem of finding a good fail tableau analogously composed of concise patterns having low confidence, and extend our algorithm to efficiently produce both types of tableaux. For example, suppose that in conjunction with the hold tableau in Table 1, we have computed the fail tableau shown in Table 3. We now know which tuples satisfy the embedded FD, and that the FD is violated mainly by purchases in the USA (possibly because some cities set their own tax rates) and electronics (possibly because the prices of electronics drop over time).

Our fifth contribution is the proposal of the range tableau for ordered attributes. Ranges, which generalize both constants and wildcards, provide more expressivity and hence more parsimony then iteratively chooses patterns with highest marginal support (and above the confidence threshold), adjusting the marginal supports for the remaining candidate patterns after each selection, until the global support threshold is met or until all candidate patterns are exhausted. For comparison with the on-demand algorithm presented next, the pseudocode given in FIG. 1 adds patterns whose confidence is below the confidence threshold even though such patterns will never be chosen and therefore need not be added. The "frontier" F maintains the remaining candidates patterns, and is initialized to be the set P of candidate patterns. Variable margSupp(p) reflects |cover(p)|, after tuples covered by tableau T have been removed, at all iterations.

Proposition 3 The greedy algorithm in FIG. 1 finds an approximately minimal tableau T with a bound on the size ratio $|T|/|T^*| \leq 1 + \ln(\hat{s}N)$ compared to an optimal tableau $T^*$, given D with thresholds $\hat{s}$ and $\hat{c}$. It has complexity $O(2^K N)$.

Proof: The size of the universe (total number of database tuples) is N, so the greedy algorithm for ŝN-SET COVER gives a $1+\ln(\hat{s}N)$ bound [11]. Each tuple in dom(X) can appear in at most $2^K$ patterns; hence the total number of candidate patterns $|P| \leq 2^K n$. Each pattern (as well as each tuple) is visited at most once during algorithm execution. The arg max can be maintained in amortized constant time by using a vector on the integer domain [1, N] (i.e., the range of possible margSupp(p)-values), where each vector element stores a list of pointers to the p's having that value.

4.3 On-demand Algorithm

The processing in lines 02-04 of FIG. 1 can be expensive, especially for large data sets. (It is similar to computing the datacube.) Moreover, updating metadata associated with unused patterns (such as cover(p') and margsupp(p') in lines 17-19) adds unnecessary overhead. If the support threshold is small, or if the data are skewed such that the support threshold can be met with only a few patterns, then pre-computing all possible candidate patterns is wasteful. The on-demand algorithm defers computation involved with patterns until as late as possible, which provides much benefit when the algorithm terminates before the patterns are needed.

Pseudocode for this subroutine is given in FIG. 2, with the changes compared to FIG. 1 indicated in boldface. We define the parents of a pattern p as those patterns with exactly one of p's constants replaced with a '—'; the children of p may be defined analogously. The algorithm initially inserts only the "null" (all-wildcards) pattern and later dynamically inserts new patterns into the frontier F. Lines 20-27 dynamically expand a pattern p to its children. The set V of visited patterns not meeting the confidence bound is maintained for the sake of delaying the expansion of children until all their parents are in V. For example, if t=(a, b, c) and p (a, —, —), then the children of p with respect to t are (a, b, —) and (a, —, c). If (and only if) (—, —, c) exists in V, then (a, —, c) is expanded. We will establish a correspondence with the (off-demand) greedy algorithm by showing that the same patterns will be chosen for T in the same order.

Proposition 4 Let P=cube(dom(X)). Let $V_k$ and $T_k$ be V and T (defined above) at some iteration k of the basic greedy algorithm, thus $P-V_k-T_k$ are the remaining candidate patterns available at step k. Given a set S of patterns, let $S^+$ include these patterns and all their descendants, that is, $\{p \in P : cover(p) \subseteq cover(S)\}$. Define the "horizon" H(S) of set S as all patterns not subsumed by another pattern in S, that is, $p \in H(S)$ iff $\not\exists \in S$ that is an ancestor of p. Then, assuming ties are broken lexicographically with the wildcard defined to come before constants, the pattern with maximum marginal support (also meeting local confidence) in both $P-V_k-T_k$ and $H(P-V_k-T_k^+)$ is the same.

Proof: All p∈T and their children will have margSupp(p)=0, so any $p \in T^+$ need not be considered and thus $\max_{x \in P-V_k-T_k}$ margSupp(x)=$\max_{x \in -V_k-T_k^+}$margSupp(x). Since every p∈H(S) must have a q∈S with marginal support at least as high, the pattern with maximum support is in both $P-V_k-T_k$ and $H(P-V_k-T_k^+)$.

Let $F_k$ denote the frontier F at the beginning of the kth iteration.

Proposition 5 At every iteration k of the on-demand algorithm, $F_k=H(P-V_k-T_k^+)$.

Proof: The proof is by induction on k.

BASE CASE: At k=0, $F_0$ contains only the null pattern and $T_0=V_0=\emptyset$. Clearly, $F_0=H(P)=H(P-V_0-T_0^+)$.

INDUCTION STEP: Assume the claim is true at iteration k. To get to k+1, either con f(p)≥ĉ or con f(p)<ĉ. If con f(p)≥ĉ, then $F_{k+1}:=F_k-\{p\}$. Since, by the inductive hypothesis, $F_k$=H $(P-V_k-T_k^+)$, and we know p∉$F_k$, $F_k-\{p\}$=H(P-$V_k$—$T_k^+$)-{p}. The right-hand side can be rewritten as H(P-$V_k$-($T_k$-{p})$^+$), which is equivalent to H(P-$V_{k+1}$-$T_{k+1}^+$) since $T_{k+1}=T_k\cup\{p\}$ and $V_{k+1}=V_k$. Therefore, $F_{k+1}$=H(P-$V_{k+1}$-$T_{k+1}^+$). Otherwise, con f(p)<ĉ, in which case $F_{k+1}$=($F_k$-{p}) $\cup\{\cup_i c_i\}$ for children $c_i$ of p having all its parents in $V_k$. Since H(S-{p})=H(S)$\cup\{\cup_i c_i\}$, we have that H(P-$V_k$-$T_k^+$) $\cup\{\cup_i c_i\}$=H(P-($V_k \cup\{p\}$)-$T_k^+$), which is equal to H(P+ $V_{k+1}$+$T_k^{+1+}$) since $T_{k+1}=T_k$ and $V_{k+1}=V_k\cup\{p\}$. Therefore, $F_{k+1}$=H(P-$V_{k+1}$-$T_{k+1}^+$).

As a result, at all steps of the on-demand algorithm, there is a correspondence with the (off-demand) greedy algorithm in terms of the patterns considered for inclusion in T.

4.4 Example

We now present a worked example of generating a tableau for the embedded FD [name, type, country]→[price, tax] on the Sales relation instance from Table 4. We set ĉ=0.8 and ŝ=0.75 (the confidence of the embedded FD is 0.75).

The first iteration inserts the null pattern into V and populates F with the 15 patterns having exactly one constant and two wildcards in the antecedent. In the second iteration, (—, —, France|—, —) has the highest support (0.45), but its local confidence is too low, so it is moved to V (but not expanded).

In the third iteration, there are three patterns in F tied for the lead in marginal support, at 0.35 each. Suppose the algorithm chooses (—, clothing, —|—, —). This pattern exceeds ĉ=0.8 and is inserted into the tableau.

Next, after all the marginal supports in F have been updated, there is one pattern in F with support of 0.35, namely (—, book, —|—, —), but its local confidence is too low. This pattern is then moved to V and expanded into (—, book, France|—, —) because both parents of this new pattern are now in V.

In the fifth iteration, the marginal support of (—, book, France|—, —) is the highest at 0.25, and it meets the local confidence threshold, so it is inserted into the tableau.

In the sixth iteration, (—, dvd, —) has the highest marginal support at 0.3, but its local confidence is too low. After getting moved to V, it expands into (—, dvd, France|—, —).

Finally, in the seventh iteration, there are three patterns with marginal support of 0.1; suppose the algorithm chooses (—, —, UK). This pattern meets the confidence threshold, and is the third and final pattern to be inserted into the tableau. Thus, the tableau is as shown in Table 1, minus consequent bindings, which will be discussed below.

Ignoring the null pattern, the on-demand algorithm considers the 15 initial patterns with two wildcards each in the antecedent, plus two additional expanded patterns. The total number of possible candidates can be shown to be 51, so fewer than one third of the patterns were explored by the on-demand algorithm.

5 Algorithm Extensions

This section discusses the following extensions: assigning constants to the consequent (Section 5.1), generating fail tableaux (Section 5.2), and generating range tableaux (Section 5.3). We also comment on choosing appropriate support and confidence thresholds (Section 5.4).

5.1 Binding the Consequent

Until now, we have only dealt with antecedent patterns. Whereas generality (wildcards) in the antecedent leads to parsimony, specificity (constants) in the consequent provides stronger assertions. To see this, recall the second row of the tableau from Table 1, which not only forces all books purchased in France to have the same tax, but also that the value be zero.

By definition, local_support(p) of pattern p does not depend on its consequent p[Y], but local_confidence(p) does—it may decrease if constants are added to p[Y] due to single-tuple violations (recall Section 2.1). Thus, a simple heuristic is to first generate the tableau and then, for each tableau pattern independently, assign constants to the consequent while remaining above the local confidence threshold. One way to implement this is as follows. For each $t_p \in T$, we first issue a query over dom(R) of the form
select count(*) from keepers(t_p)
cube by y1, y2, ..., yi
with $y_i$s being attributes in Y. Observe that this query computes the sizes of the keepers sets for all possible bindings of the consequent. We then choose the binding with the fewest wildcards in the consequent that exceeds ĉ.

Recall the example in Section 4.4. We show how the consequent binding tax=0 may be assigned to pattern (—, book, France|—, —). The size of the cover set of this pattern is 5. Suppose that ĉ=0.79, meaning that the size of the keepers set must be at least 4. The output of the corresponding datacube is illustrated in Table 6. Highlighted in bold are the two bindings that meet the local confidence threshold; (all, 0) has fewer wildcards and corresponds to (—, book, France|—, 0).

TABLE 6

Computing the sizes of the keepers sets for different bindings of the consequent of pattern (—, book, France|—, —).

| price | tax | count(*) |
|-------|-----|----------|
| all | all | 5 |
| 10 | all | 3 |
| 25 | all | 2 |
| all | 0 | 4 |
| all | 0.05 | 1 |
| 10 | 0 | 2 |
| 25 | 0 | 2 |
| 10 | 0.05 | 1 |

5.2 Generating Fail Tableaux

We have observed that the set of tuples in dom(R) which violate a CFD may be of interest, and summarizing such tuples in addition to the hold tableau provides added value. Therefore, we define the fail tableau generation problem as follows.

Definition 3 We are given a CFD $\phi=(R:X\rightarrow, T)$, a relation instance dom(R), a support threshold $\hat{s}_{err}$, and a confidence threshold $\hat{c}_{err}$. An optimal fail tableau Tf with respect to hold tableau T is one having the smallest size such that its global marginal support with respect to T is above $\hat{s}_{err}$ and $\forall t_p \in Tf$, marginal_local_confidence($t_p$)$\leq \hat{c}_{err}$.

Given the similarity of this problem to that of generating hold tableaux, we can reuse the on-demand algorithm with two minor modifications. First, in order to compute marginal local confidences, we recompute the keepers and count sizes (kp and ct; recall Section 4.1) for each remaining pattern using only those tuples not covered by T. Second, only those patterns whose marginal local confidence is below $\hat{c}_{err}$ may be included in Tf. Note that it does not make sense to bind values of the consequent in the fail tableau since, by definition, each candidate pattern has low confidence and therefore is matched by tuples agreeing on the antecedent but not the consequent.

We give an example of constructing a fail tableau using the CFD from Table 1 over the Sales relation instance from Table 4. There are five tuples not covered by the hold tableau, with tids of 6, 7, 18, 19 and 20. These five tuples satisfy the embedded FD with a confidence of ⅖. Suppose we want the fail tableau to cover half of these uncovered rows with a $\hat{c}_{err}$ threshold just below ⅖, say 0.38. This can be accomplished with a single fail tableau pattern: (Terminator, dvd, France|—, —).

TABLE 7

Range tableau for the FD [country, date] → [tax]

| country | date | tax |
|---------|------|-----|
| France | [Jan. 01, 2008, Apr. 30, 2008] | 0.05 |
| France | [May 01, 2008, Dec. 31, 2008] | 0.06 |

5.3 Generating Range Tableaux

We define a range tableau Tr as a tableau with all attributes from X and Y, where for each row $t_p \in Tr$ and each (ordered) attribute $A \in X \cup Y$, $t_p[A]=[a_l, a_r]$, with $a_l, a_r \in$ dom(A), $a_l \leq a_r$. Note that ranges generalize both constants and wildcards, as a constant a can be written [a, a] and '—' can be written [$a_{min}$, $a_{max}$], where $a_{min}$=min dom(A) and $a_{max}$=max dom(A). Given a tuplet∈dom(R) and row $t_r \in Tr$, we write $t[S] \asymp t_r[S]$ iff for each attribute A of S, $t[A] \in t_r[A]$; that is, t matches tableau row $t_r$ if $t[A]$ is an element of the range $t_r[A]$ for every attribute A. We say that a relation instance dom(R) satisfies a CFD $\phi=(R: X \rightarrow Y, Tr)$ iff $\forall t_i, t_j \in dom(R)$ and $\forall t_r \in Tr$, if $t_i[X]=t_j[X] \asymp t_r[X]$ then $t_i[Y]=t_j[Y] \asymp t_r[Y]$.

Of course, it is possible to define a "hybrid" tableau in a straightforward way, where ordered attributes in the tableau may have ranges, and the unordered attributes have regular patterns. Also, note that one can restrict the choices for $a_l$ and $a_r$ (or even have them come from outside dom(A)), for example, to ensure any two ranges must either overlap completely or not at all. This allows for interesting special cases such as prefix hierarchies (e.g., IP addresses). Finally, as with regular patterns with wildcards, a range pattern does not imply that the tuples matching the range predicate in the antecedent must satisfy the confidence threshold for each distinct range value, nor that the keepers of any pair of distinct range values have identical values in the consequent; rather, a tableau row with a range is simply a concise way of conditioning on the embedded FD.

The greater expressivity of ranges gives rise to more tableau row candidates (a superset), which in turn allows the global support threshold to be met with fewer tableau rows, compared to regular patterns. Recall the Sales relation from the Introduction and suppose that the FD country a tax holds. In particular, suppose that the tax rate in France is 0.05. Now suppose that the tax rate in France changed to 0.06 on May 1, 2008. This can be expressed very concisely using a modified FD of the form [country, date]→tax and the range tableau shown in Table 7. This is vastly more compact than listing all the dates of 2008 in separate patterns.

The number of candidate patterns grows rapidly with ranges when any arbitrary subrange of the cross-product of the domains can be considered. This blow-up makes the basic greedy algorithm infeasible even for moderate domain sizes due to a prohibitive number of candidates, and provides even stronger motivation for the on-demand algorithm.

The on-demand algorithm is easy to extend to ranges as it is quite similar to that without ranges. In fact, all of the pseudocode from FIG. 2 remains the same; the only change is in how to expand patterns that fail the confidence threshold. The children of a pattern p are determined as follows. For each attribute A (let p[A] be $[a_l, a_r]$), p has children $[a_{l+1}, a_r]$ and $[a_l, a_{r-1}]$ in attribute A if $a_l < a_r$, all other attributes staying the same. For example, let X=ABC and suppose $p[X]=([a_2, a_9], [b_5, b_5], [c_3, c_4])$. Its children are $([a_3, a_9], [b_5, b_5], [c_3, c_4])$, $([a_2, a_8], [b_5, b_5], [c_3, c_4])$, $([a_2, a_9], [b_5, b_5], [c_4, c_4])$, and $([a_2, a_9], [b_5, b_5], [c_3, c_3])$. Finding the parents of a pattern with ranges is similar: for each attribute A with range $[a_l, a_r]$, it has a parent with range $[a_{l-1}, a_r]$ if $a_l > a_{min}$ and a parent with range $[a_l, a_{r+1}]$ if $a_r < a_{max}$, all other attributes staying the same.

5.4 Choosing Support and Confidence Thresholds

Clearly, $\hat{c}$ should be chosen to be higher than the confidence of the embedded FD, else the FD would suffice. Often, the user will have a fixed target $\hat{c}$ in mind (perhaps based on domain knowledge of the number of exceptions to allow [14]) and be more flexible with respect to $\hat{s}$. A special case of interest is when $\hat{c}=1$, which will result in a global confidence of 1 and corresponds to exact CFDs. In this case, the highest s for which there exists a tableau that can be $(\hat{s}, \hat{c})_{gg}$-satisfied may be desired. However, maximizing the support is not necessarily desirable as it could "overfit" the data. Since we are using a greedy algorithm, the user can choose s on-the-fly, stopping when the maximum marginal support over all the remaining patterns is small. This ensures that spurious patterns with low support are not included in the tableau. Another useful stopping criterion is that the size of the tableau grows excessively large. Similarly, for fail tableaux, we can choose $\hat{s}_{err}$ on-the-fly, and $\hat{c}_{err}$ to be slightly lower than the (global) confidence of the remainder of dom(R) not covered by the hold tableau.

6 Experiments 6.1 Setting We now present an evaluation of the proposed tableau generation solutions on two real data sets. The first data set, also used in [9], contains 300K sales records from an online retailer. The schema extends the Sales relation from the motivating example in Section 1:

Sales(tid, itemid, name, type, price, tax, country, city)

The new attribute is the item identifier itemid. The second data set is a 30-day excerpt of a network configuration table from a large ISP's database. This is an append-only collection of daily snapshots describing the configuration of every interface attached to every router in the network.

The partial schema is:
(date, router_name, interface_name, interface_type, IP_address, . . . )

Possible interface types include Gigabit Ethernet, ATM, etc. The total size of this configuration table is confidential, as is the number of routers and interfaces in the network.

Our copy of the network configuration database is located on a SPARC III with 5 processors of 900 MHz each. For consistency, all of our experiments were done on that machine, using a C++ implementation of the greedy set cover algorithm and our improved on-demand algorithm. All performance measurements reported in this paper represent averages of five trials.

Table 8 lists the embedded FDs used in our experiments. FD1 refers to the sales table, while FD2, FD3, and FD4 refer to the network configuration table. Note that FD2 asserts that the IP address of an interface does not change over time, unless the router and/or interface name also changes. FD3 relaxes FD2 and allows interfaces with the same name on the same router to have different IP addresses at any point in time, provided that the interface types are different. Finally, FD4 allows interfaces with the same name on the same router to have different IP addresses in different daily snapshots.

The remainder of this section presents experimental results on the above four FDs over the above two real-life data sets. In brief, we have observed that:

Compared against optimal tableaux, our algorithms return tableaux whose sizes are far smaller than the upper bound given by the approximation guarantee.

TABLE 8

Embedded FDs used in the experiments

| | embedded FD |
|---|---|
| FD1 | type,name,country → price,tax,itemid |
| FD2 | router_name,interface_name → IP_address |
| FD3 | router_name,interface_name,interface_type → IP_address |
| FD4 | router_name,interface_name,date → IP_address |

The relative performance improvement of the on-demand algorithm as compared to the basic greedy algorithm increases as the number of candidate tableau patterns increases, and exceeds one order of magnitude in our experiments using FD4.

Range tableaux may be orders of magnitude smaller than standard pattern tableaux if the embedded FD holds for a range of values of antecedent attributes.

6.2 Tableau Generation

We begin by generating hold tableaux for FD1, whose confidence is 0.871. We set the local confidence threshold ĉ to 0.88 and test several global support thresholds ŝ between 0.3 and 0.9. Table 9 lists the sizes of the hold tableaux generated by our algorithm, the optimal tableau sizes, and the global confidences. Optimal tableau sizes were computed using CPLEX (www.cplex.com), a worst-case exponential-time integer program solver. Note that:

Our algorithms return hold tableaux whose sizes are equal to or nearly equal to the optimal sizes.

The global confidences of the resulting CFDs are above the local confidence threshold of 0.88 (and therefore above the confidence of FD1 itself).

When the global support threshold is below 0.8, the hold tableaux are very small.

Table 10 illustrates the first ten rows of the 41-row hold tableau for s=0.8. The marginal support and local confidence of each row are also shown. The remaining 31 rows are of the form (—, —, C|—, —), where C is some country code, and have very low marginal support. Note that choosing the first two or three rows alone yields a global support of 0.66 and 0.778, respectively.

TABLE 9

Summary of hold tableau properties for FD1, ĉ = 0.88

| support threshold | size | opt size | global conf |
|---|---|---|---|
| 0.3 | 1 | 1 | 0.908 |
| 0.4 | 2 | 2 | 0.916 |
| 0.5 | 2 | 2 | 0.916 |
| 0.6 | 2 | 2 | 0.916 |
| 0.7 | 3 | 3 | 0.922 |
| 0.8 | 41 | 41 | 0.924 |
| 0.9 | 1690 | 1689 | 0.927 |

Also note that all but the first three rows have very low marginal support, which explains why the tableau size increases significantly if ŝ>0.8 is desired (recall Table 9). This means that if we stop the tableau generation algorithm when all remaining candidate patterns have marginal support under, say, 0.002, then it is not possible to reach ŝ>0.778 with ĉ=0.88. Finally, observe that some patterns contain constants in the tax attribute of the consequent; e.g., the tax on all purchases made in Great Britain (GBR) is 6.79, regardless of the item type or title.

TABLE 10

First ten rows of a hold tableau for FD1 (ŝ = 0.8, ĉ = 0.88)

| type | name | country | price | tax | itemid | mar. sup. | loc. conf. |
|---|---|---|---|---|---|---|---|
| book | — | — | — | — | — | 0.335 | 0.91 |
| music | — | — | — | — | — | 0.331 | 0.92 |
| — | — | GBR | — | 6.79 | — | 0.112 | 0.97 |
| — | — | ETH | — | 5.86 | — | 0.001 | 1 |
| — | — | NCL | — | 2.07 | — | 0.001 | 1 |
| — | — | VAT | — | — | — | 0.001 | 1 |
| — | — | JOR | — | — | — | 0.001 | 1 |
| — | — | MDA | — | 4.88 | — | 0.001 | 1 |
| — | — | DEU | — | 9.42 | — | 0.001 | 1 |
| — | — | BRB | — | — | — | 0.001 | 1 |

We remark that the usage of wildcards in tableau patterns is the key to achieving compactness. For example, suppose that a tableau for FD1 may contain only those "patterns" which have constants for each antecedent attribute (no wildcards). There are over 194,000 such patterns in the data set which have local confidence above 0.88. Using only these patterns, it requires over 50,000 rows to attain a global support of 0.3 and over 111,000 rows to attain a 0.5 global support.

Next, we examine the robustness of the solutions produced by our algorithm by comparing tableaux generated according to independently chosen uniform random samples of the sales data. Table 11 lists tableau sizes obtained by running our algorithm on four 30K samples (c=0.88). For ŝ<0.8, all the tableaux, including the original tableau over the full 300K data set, are identical. For higher global support thresholds, the tableaux differ only in patterns that have very low support. These experiments suggest that the generated tableaux are robust to changes in the underlying data set. Of course, there may be cases when the data set and its semantics change significantly and the tableaux must be re-computed. This is an important issue for future work that is outside the scope of this paper.

TABLE 11

Tableau sizes for 4 random samples of the sales data

| support threshold | sample 1 | sample 2 | sample 3 | sample 4 |
|---|---|---|---|---|
| 0.3 | 1 | 1 | 1 | 1 |
| 0.4 | 2 | 2 | 2 | 2 |
| 0.5 | 2 | 2 | 2 | 2 |
| 0.6 | 2 | 2 | 2 | 2 |
| 0.7 | 3 | 3 | 3 | 3 |
| 0.8 | 39 | 41 | 33 | 35 |
| 0.9 | 623 | 540 | 625 | 517 |

Figure 3:
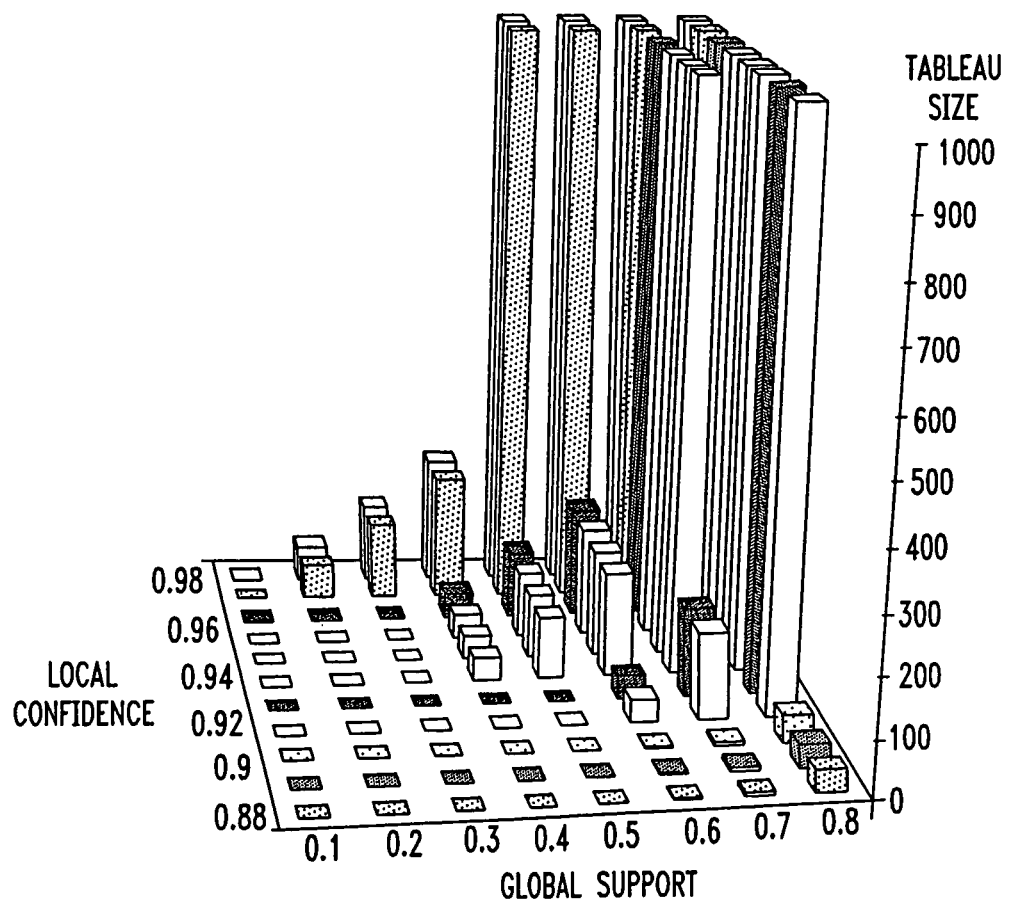
FIG. 3 is a graph showing tableau size as a function of local confidence and global support.
Figure 4A:
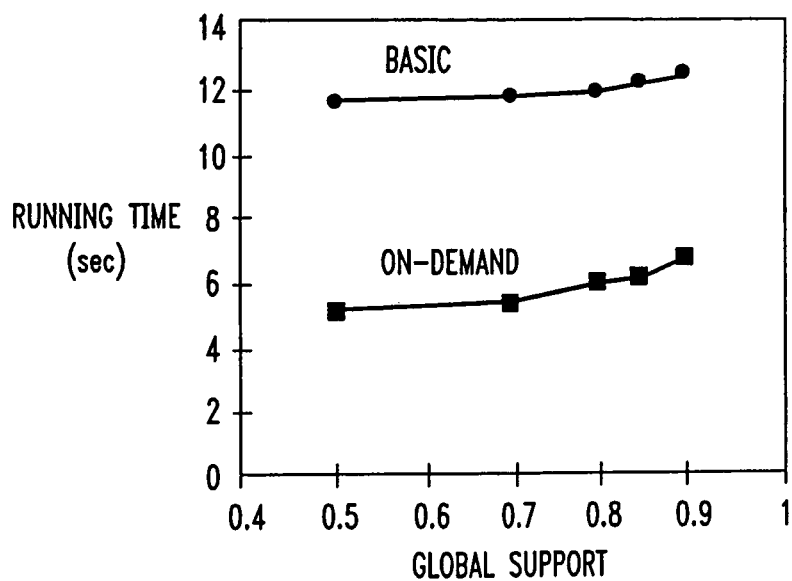
Figure 4B:
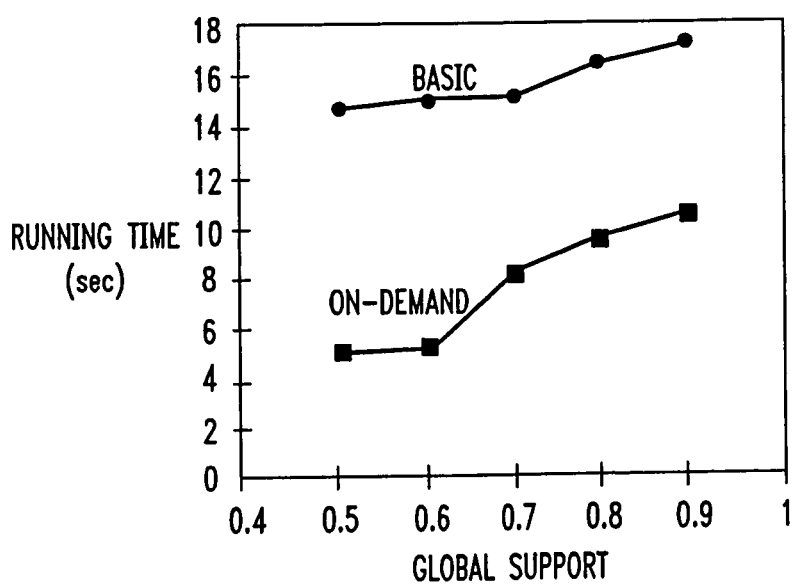
Figure 4C:
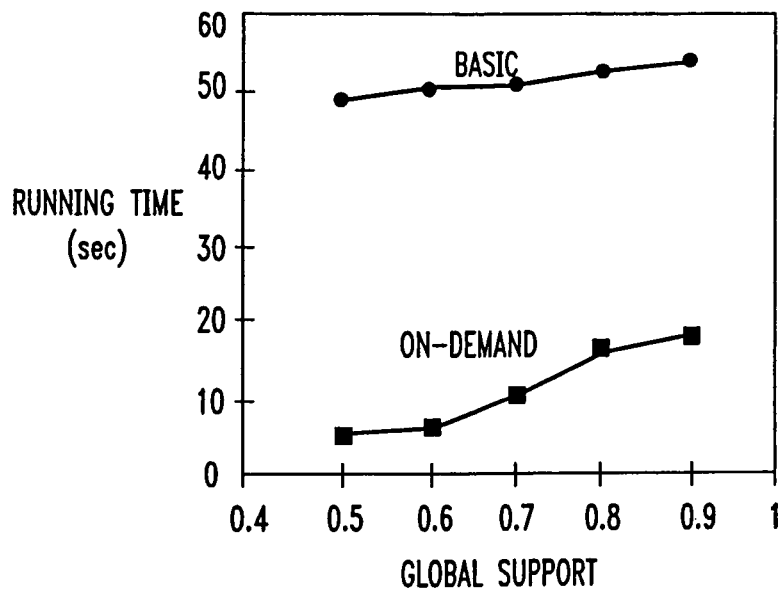
Figure 4D:
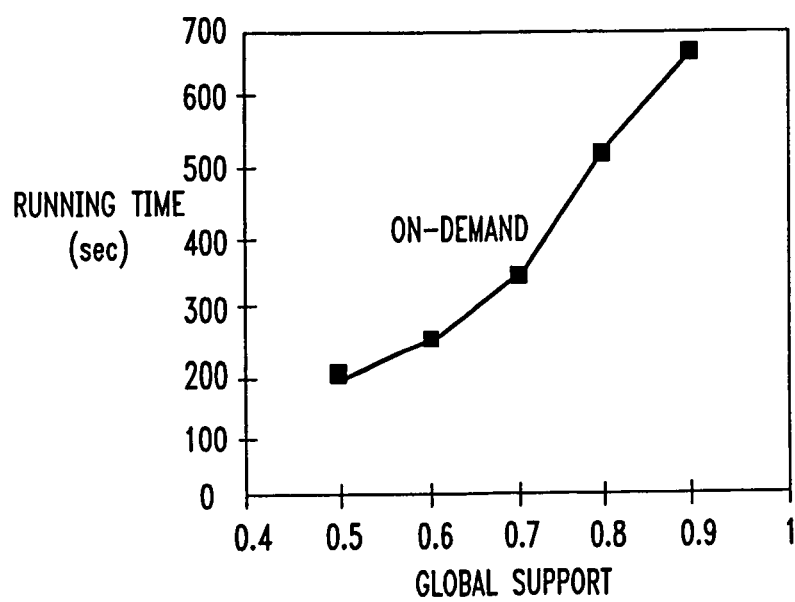
Figure 4E:
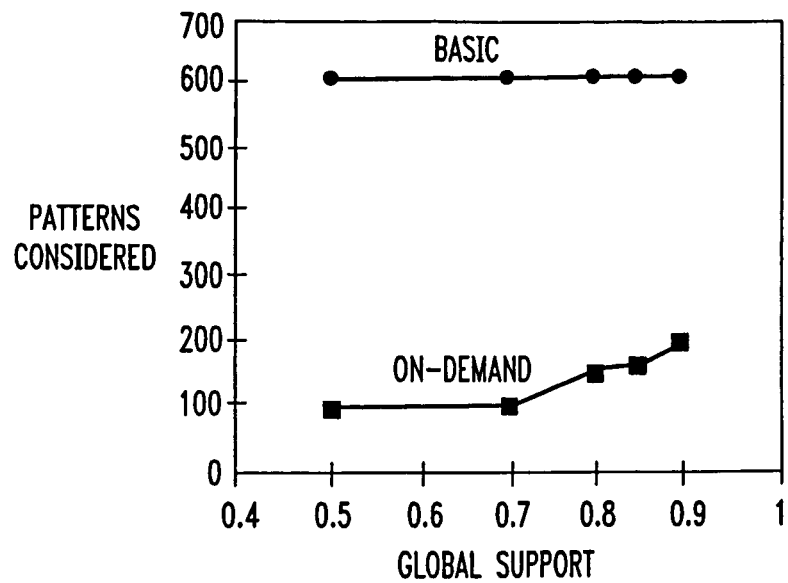
Figure 4F:
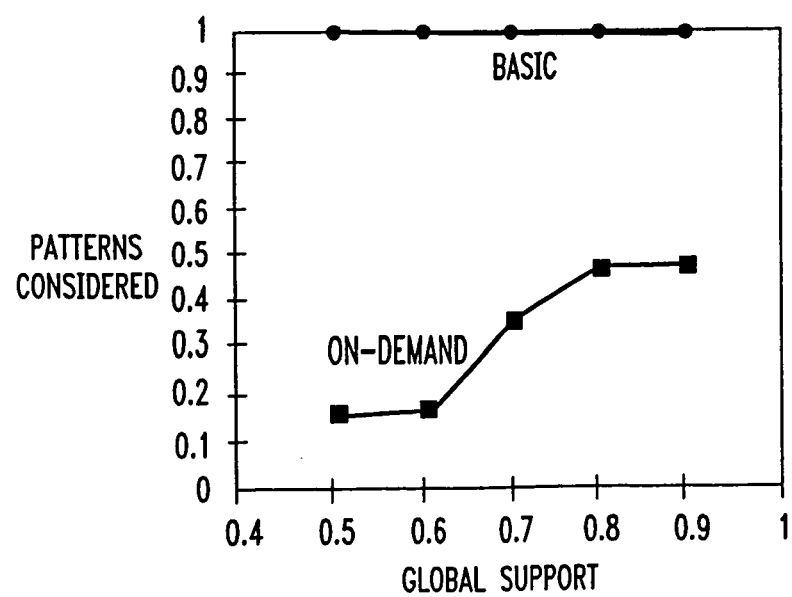
Figure 4G:
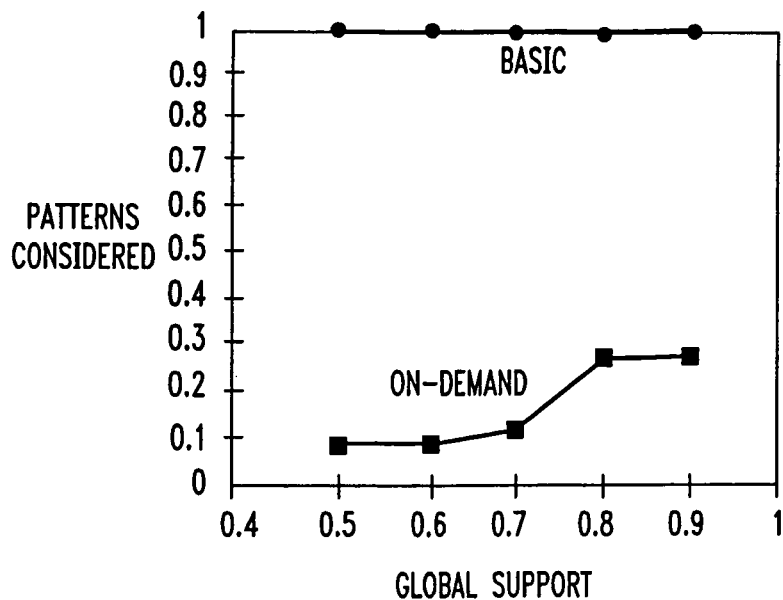
Figure 4H:
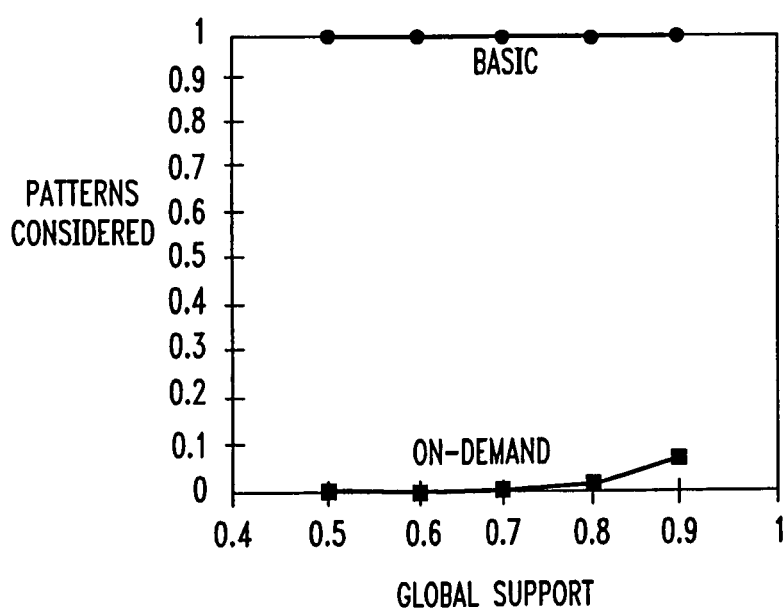

We also show the effect of varying the local confidence threshold. FIG. 3 graphs the tableau size for FD1 as a function of ŝ and ĉ; for display purposes, the z-axis has been cropped at 1000. Increasing ĉ reduces the number of candidate patterns with high supports to choose from and thus leads to larger tableaux. For example, recall Table 10 and suppose that c=0.95. The first two patterns (type=book and type=music), whose total support is 0.666, now fall below the confidence threshold and cannot be included in the tableau. As a result, even if ĉ=0.5, the hold tableau already contains 109 patterns. Furthermore, it is impossible to achieve ŝ>0.8 using ĉ≥0.95 because there are not enough candidate patterns meeting this confidence threshold.

Table 12 shows the first ten rows of the 68-row fail tableau for FD1, given an initial hold tableau with ĉ=0.88 and ŝ=0.5 (i.e., the initial hold tableau consists of the first two rows of Table 10 and actually attains a global support of 0.667). The marginal local support and marginal local confidence of each row in the fail tableau are also listed. The desired global support of the fail tableau was set to 0.25, which covers 75 percent of tuples that have not been covered by the original hold tableau. The local confidence threshold was set to 0.79, which is one percent lower than the global confidence of the 50 percent of the table not covered by the hold tableau. For brevity, the fail tableau shown in Table 12 is projected on the antecedent attributes as all the patterns have all-wildcards in the consequent attributes. Observe that the first pattern concisely illustrates that the same item (type and title) purchased in the USA may be charged a different tax in different transactions because the tax rate varies from state to state. Note that all but the first row have very low marginal local support. Also note that the fail tableau has size one (the first row of Table 12) for values of global support below 0.11, regardless of the global support threshold of the initial hold tableau.

Note that the above fail tableau is small enough to be easily interpreted by a human and is more user-friendly than a raw list of tuples that violate the embedded FD. In particular, these 68 fail patterns concisely represent a total of over 32,000 violating tuples. Moreover, reaching the same level of global support using only patterns without wildcards (in the antecedent) requires a fail tableau of size over 9,000.

Moving on to the network configuration data, Table 13 lists the tableau size returned by our algorithms, the optimal tableau size computed by CPLEX, and the size of the corresponding fail tableaux (that cover 50 percent of the tuples that are not covered by the hold tableaux) for FD2 through FD4, using support thresholds ranging from 0.5 to 0.9. Notably, CPLEX was unable to

TABLE 12

First ten rows of a fail tableau for FD1 ($\hat{s}$ = 0.25, $\hat{c}$ = 0.77)

| type | name | country | marginal supp | local conf |
|---|---|---|---|---|
| — | — | USA | 0.111 | 0.40 |
| — | Romeo and Juliet | — | 0.001 | 0.33 |
| — | Les Miserables | — | 0.001 | 0.43 |
| — | Phantom of the Opera | — | 0.001 | 0.52 |
| — | Hound of the Baskervilles | — | 0.001 | 0.54 |
| — | The Raven | — | 0.001 | 0.64 |
| — | The Three Musketeers | — | 0.001 | 0.49 |
| — | Of Human Bondage | — | 0.001 | 0.56 |
| — | Within the Law | — | 0.001 | 0.58 |
| — | Bluebeard | — | 0.001 | 0.59 | return the optimal tableau sizes for FD4 because the number of candidate patterns was too large. This underscores the need to use an approximation algorithm. Now, for each hold tableau, the value of $\hat{c}$ is set to one percent above the confidence of the respective embedded FD; for each fail tableau, the value of its $\hat{c}$ is set to one percent below the confidence of the remaining tuples that have not been covered by the corresponding hold tableau. Due to the proprietary nature of the network data, we cannot reveal any further details or show the actual tableaux. However, we can say that the network configuration table is larger than the sales data set, and the number of tableau candidate patterns is also larger. The number of candidate patterns for FD4 is roughly 30 times as much as for FD2 due to the 30 possible values of date that occur for nearly each router and interface name.

In general, the observations we have made about the sales data set are also true for the network data set. In particular, 1) our algorithms still generate tableaux with optimal or near-optimal sizes; 2) the global confidences of the resulting CFDs are above $\hat{c}$; 3) tableau sizes increase dramatically for very high global support thresholds, after candidate patterns with high marginal supports have been exhausted; and 4) fail tableau sizes are small enough to be easily interpreted by a human. Although the tableau sizes are now somewhat larger, they are still orders of magnitude smaller than those containing only patterns with wildcard-free antecedents.

TABLE 13

Summary of hold and fail tableau sizes for:

| support threshold | size | optimal size | fail tableau size |
|---|---|---|---|
| (a) FD2 | | | |
| 0.5 | 76 | 76 | 127 |
| 0.6 | 156 | 156 | 78 |
| 0.7 | 360 | 358 | 43 |
| 0.8 | 20062 | 19834 | 20 |
| 0.9 | 66604 | 66376 | 5 |
| (b) FD3 | | | |
| 0.5 | 12 | 12 | 68 |
| 0.6 | 46 | 46 | 24 |
| 0.7 | 144 | 144 | 3 |
| 0.8 | 12254 | 12217 | 1 |
| 0.9 | 59096 | 58759 | 1 |
| (c) FD4 | | | |
| 0.5 | 27 | N/A | 155 |
| 0.6 | 86 | N/A | 92 |
| 0.7 | 198 | N/A | 4 |
| 0.8 | 1228 | N/A | 3 |
| 0.9 | 53854 | N/A | 2 |

6.3 Algorithm Performance

We now demonstrate how the on-demand strategy improves the performance of the greedy algorithm for generating tableaux. We ignore the running time of the post-processing step that assigns constants to the consequent attributes (its cost is the same for both versions) and only measure the time to create hold tableaux (the relative performance improvements of the on-demand algorithm on fail tableaux are very similar). We also ignore the time needed to compute the table D that is used by our algorithms (recall Section 4.1) as it is the same for both versions and heavily depends on the underlying database.

Consider the two graphs in the top row of FIG. 4. They illustrate the running time (left) and number of candidate patterns considered (right) as functions of $\hat{s}$, comparing the basic and on-demand greedy algorithms using FD1. In summary, the on-demand algorithm is roughly twice as fast, while considering no more than one third of the total number of candidate patterns, which is 607,433. Note that the total number of candidate patterns is significantly smaller than the upperbound of $2^3 \times 216,824 \approx 1.7$ million. This means that the antecedent attributes are not completely independent as some values of one attribute co-occur only with a subset of the values of another. Both algorithms perform slightly worse as $\hat{s}$ increases because more patterns are required to meet the threshold, and thus more candidate patterns are expanded and maintained. It is worth noting that CPLEX took up to one hour to compute the optimal solution, while even the basic greedy algorithm terminated in under 15 seconds.

The next two rows of FIG. 4 refer to FD2 and FD3, respectively, and indicate that the relative performance improvement of the on-demand algorithm increases as the number of attributes in the antecedent of the embedded FD increases. We report the fraction of candidate patterns in the y-axis of the plots on the right. On FD2, which has two antecedent attributes, the on-demand algorithm is again about twice as fast and considers a small fraction of the possible patterns. On FD3, which contains an additional attribute in the antecedent, the on-demand algorithm is roughly five times as fast and considers even fewer possible patterns. Both algorithms are slower on FD3 than on FD2 because the number of possible patterns is larger.

Finally, the bottom row of FIG. 4 refers to FD4 and shows that on-demand dramatically outperforms the basic algorithm as the number of candidate patterns for the tableau increases (by a factor of about 30 as compared to FD2). Even for $\hat{s}$=0.9, the on-demand algorithm found a solution in under 12 minutes. In contrast, the running time of the basic algorithm was "off the scale" at over 12 hours, even for $\hat{s}$=0.5, which amounts to a difference of more than an order of magnitude. The key to the on-demand algorithm's efficiency in this example was that it considered a very small fraction of the possible patterns (less than one percent for small values of ŝ, under 7 percent for ŝ=0.9).

6.4 Generating Range Tableaux

Our final experiment illustrates the ability of range tableaux to parsimoniously express the semantics of the data when the embedded FD holds conditionally within a range of values of the antecedent attributes. We test FD4 over an older 30-day excerpt of the network configuration table, and, for simplicity, convert the date values to integers from one to 30. We chose this excerpt because we knew that most interfaces had unique IP addresses up to a certain point of time in that range. The on-demand algorithm correctly identified this phenomenon, and, for ŝ<0.7, produced a tableau with a single pattern: (—, —, [1,26]|—, —). As shown in Table 14, reaching this support threshold without ranges required 76 patterns. Moreover, it was not possible to attain ŝ>0.8 without using ranges due to the lack of candidate patterns that meet the local confidence threshold. On the other hand, patterns with ranges easily covered 90 percent of the data. Although the number of candidate patterns considered by the on-demand algorithm with ranges was lower than that of on-demand without ranges, its running time was 10-20 percent slower, most likely due to our unoptimized implementation of range exploration.

TABLE 14

Reducing tableau size for FD4 with attribute ranges

| support threshold | size | size with ranges |
|---|---|---|
| 0.5 | 23 | 1 |
| 0.6 | 76 | 1 |
| 0.7 | 328 | 2 |
| 0.8 | 2634 | 4 |
| 0.9 | N/A | 320 |

7 CFD Tuning 7.1 Problem Definition

In this section, we discuss "tuning" a CFD by modifying its embedded FD. The input is a relation instance r, a CFD (R:X→Y,$T_p$), and a set of "antecedent expansion" attributes E ∈ R, such that E∩(X∪Y)=∅. The output consists of all CFDs based on the cross-product of all embedded FD antecedent expansion and consequent reduction combinations, and their respective global confidence measures. More formally, the output is a set of pairs ($\phi_{ij}$, $c_{ij}$), where ∀$E_i$ ⊂ E, $Y_j$ ⊂ Y($Y_j$≠∅), $\phi_{ij}$=(R:X $E_i$→$Y_j$, $T_{ij}$), where "extends" $\overline{T_p}$ with all-underscores for the new attributes in $E_i$ and projects out the attributes in Y-$Y_j$. Furthermore, $c_{ij}$ is the global confidence of $\phi_{ij}$.

These CFDs make weaker assertions on the data than the original CFD and therefore are expected to hold with higher confidence. Note that the global support of each CFD $\phi_{ij}$ is the same as that of the original CFD because constants have not been added to the antecedent of any tableau. Finally, note that all the CFDs having the same consequent incur STVs by exactly the same tuples, regardless of the antecedent.

7.2 Efficient Algorithm

Recall the algorithm in FIG. 1 for computing the global confidence of a single CFD. A naive way to solve the problem at hand is to re-run this algorithm for each $\phi_{ij}$. Our first improvement employs the data cube operator [10] to simultaneously compute the counts needed to derive the confidence of each CFD (i.e., the views counts and maxcounts). Effectively, the algorithm "cubes" too many tuples in counts and then removes those which cause STVs of a given set of CFDs. The pseudocode

```
// Tuples that match some pattern in original tableau
CREATE VIEW supported AS
    SELECT * FROM r WHERE EXISTS
    (SELECT * FROM Tp WHERE Tp.X ≍ r.X)
// Distinct value counts of XEY
CREATE VIEW counts AS
    SELECT X, E, Y, count(*) as cnt FROM supported
    GROUP BY X, E, Y WITH CUBE
    HAVING X IS NOT NULL
For each subset $Y_k$ ⊆ Y, $Y_k$ ≠ ∅
    Let $T_k$ be the tableau corresponding to the FD X → $Y_k$
    CREATE VIEW maxcounts AS
        SELECT X, E, MAX(cnt) AS maxcnt FROM counts AS c
        // select counts where all but Yk are rolled up
        WHERE $Y_k$ IS NOT NULL AND Y - $Y_k$ IS NULL
        // ignore tuples causing STVs
        AND NOT EXISTS
        (SELECT * FROM Tp WHERE Tk.X≍c.X AND Tk.Yk≭c.Yk)
        GROUP BY X, E WITH CUBE
        HAVING X IS NOT NULL
// Sum up clean tuples and divide by global support
For each $E_j$ ⊆ E
    CREATE VIEW global.confidence AS
        (SELECT SUM(maxcnt) FROM maxcounts
        WHERE Ej IS NOT NULL AND E-Ej IS NULL) /
        SELECT COUNT (*) FROM supported
``` is shown above; for brevity, we refer to attribute sets using single variables (X, E, Y, etc.) instead of listing individual attributes. The HAVING clause in counts and maxcounts removes counts where A=NULL for every attribute A∈X. These rows are not needed since X appears in the antecedent of every $\phi_{ij}$. Next, view max_counts is computed for each CFD having the same consequent. Each time, we extract the appropriate rows from counts, i.e., those where all the attributes in the consequent set $Y_k$ are not cubed. We also discard tuples causing STVs using the tableau with only the attributes from $Y_k$ in the consequent. Finally, for each attribute set in the antecedent, computing global_confidence requires summing up a subset of the data cube, namely rows where all the attributes in the given attribute set are not null.

The motivation behind our second improvement is simple: first create a cube over only those tuples which do not cause STVs of any CFD, and then, whenever necessary, add tuples that only violate some CFDs. This approach reduces the work done by expensive cube operations, but the challenge is to efficiently identify which tuples must be added later. We exploit the following observation. Let $Y_i$ and $Y_j$ be two subsets of Y. For any fixed $E_i$e,uns ⊂ E, let $\phi_{ij}$=(R:X$E_i$→$Y_j$, $T_{ij}$) and $\phi_{ik}$=(R:X$E_i$→$Y_k$, $T_{ik}$) be two CFDs. If a tuple t does not cause a STV of $\phi_{ij}$ and $\phi_{ik}$, then it cannot cause a STV of $\phi'$=(R: X$E_i$→$Y_j Y_k$, T'), where the tableau T' is equivalent to $T_{ij}$ and $T_{ik}$ on all the antecedent attributes and contains the union of their consequent attributes. Hence, if we know which tuples satisfy $\phi_{ij}$ and $\phi_{ik}$k, the intersection of those two sets yields tuples that satisfy $\phi'$.

A simple implementation of the revised algorithm is shown below. Finding tuples that cause a STV of at least one CFD is accomplished via the tableau of the CFD (X→Y, $T_p$), which includes all the attributes in Y in the consequent (removing attributes from the consequent can only decrease STVs). counts is then computed over the set of tuples that do not cause any STVs. Next, the set of views patch_a contain tuples not included in counts that do not cause any STVs of CFDs with single attributes in the consequent. According to the above observation, taking intersections of these views is sufficient to compute the set of tuples not in counts that satisfy any $\phi_{ij}$ (see all_patches. (A straightforward extension is to also precompute sets of tuples that do not cause STV's of CFDs with more attributes in the consequent, and use them in view all_patches. These sets of tuples, which we call "patches", are then cubed (patch_counts) and merged with counts (all_counts). (Note that outer join signifies that all the rows from counts must be included in all_counts, not only those which have been modified by patches.)

```
// Tuples that match some pattern in original tableau
CREATE VIEW supported AS
   SELECT * FROM r WHERE EXISTS
   (SELECT * FROM Tp WHERE Tp.X≍ r.X)
// Supported tuples that cause STVs of original CFD
CREATE VIEW stv AS
   SELECT * FROM supported s WHERE EXISTS
   (SELECT * FROM Tp WHERE Tp.X≍ s.X AND Tp.Y≭ s.Y)
// Supported tuples that do not cause STVs
CREATE VIEW no_stv AS
   SELECT * FROM supported EXCEPT (SELECT * FROM stv)
// Cube of distinct value counts of X∈Y in no_stv
CREATE VIEW counts AS
   SELECT X, E, Y, count (*) AS cnt FROM no_stv
   GROUP BY X, E, Y WITH CUBE
   HAVING X IS NOT NULL
For each attribute a in Y
   Let T_a be the tableau corresponding to the FD X → a
   // STVs of at least one CFD, but not (R:X ->a, Ta)
   CREATE VIEW patch.a AS
      SELECT * FROM stv WHERE NOT EXISTS
      (SELECT * FROM Ta
      WHERE Ta. X≍ stv.X AND Ta.a≭ stv.a)
For each subset Y_k ⊆ Y, Y_k ≠ θ
   Let a_1, a_2, . . . , a_i be all the attribues of Y_k
   Let Y_n = Y - Y_k // set of attributes not in Y_k
   // Compute patch for current group of FDs
   CREATE VIEW all_patches AS
      SELECT * FROM patch_a1
      INTERSECT SELECT * FROM patch_a2
      INTERSECT . . . INTERSECT (SELECT * FROM patch_ai)
   // Mini-cube over the current patch
   CREATE VIEW patch.counts AS
      SELECT X, E, Yk, count (*) as cnt FROM all_patches
      GROUP BY X, E, Yk WITH CUBE
      HAVING X IS NOT NULL AND Yk IS NOT NULL
   // Merge mini-cube with view counts
   CREATE VIEW all_counts AS
      SELECT .X, E, Y, c.cnt + p. cnt as cnt
      FROM counts AS c OUTER JOIN patch_counts p
      WHERE c.X=p.X AND c.E=p.E AND c.Yk=p.Yk
      AND c.Yk IS NOT NULL AND c.Yn IS NULL
   CREATE VIEW maxcounts AS
      SELECT X, E, MAX(cnt) as maxcnt FROM all_counts
      GROUP BY X, E WITH CUBE
      WHERE X IS NOT NULL 29
For each E_j ⊆ E
   CREATE VIEW global_confidence AS
      (SELECT SUM(maxcnt) FROM maxcounts
      WHERE E_j is not null and E - Ej IS NULL) /
      SELECT COUNT(*) FROM supported
```

Related Work

Conditional functional dependencies were proposed in [4] for data cleaning. Existing work on CFDs considered the problems of validating a given CFD on a relation instance [4], determining consistency and implications of multiple CFDs [4, 5], and "repairing" the relation so that the given CFD is satisfied [9]. However, these all assume a pattern tableau is supplied. Ours is the first paper to formally define what constitutes a good tableau and investigate the problem of generating one automatically. We remark that our problem is orthogonal to that of computing a minimal cover for a set of CFDs (with existing tableaux) over different sets of attributes, as discussed in [4]. There, an extension of Armstrong's axioms was developed to remove CFDs that are implied by others. In contrast, we want to discover a minimal set of patterns for a single CFD meeting specified support and confidence thresholds.

The problem of discovering approximate functional dependencies, given a confidence threshold, was studied in [14, 17]. However, the goal there was to find antecedent and consequent attributes from among the different subsets of attributes in the schema which approximately satisfy the FD over the entire relation. Hence, this work is complementary to our problem, which involves conditioning over different subsets of the data to find subsets that approximately hold given a fixed FD.

The terms "support" and "confidence" used here were inspired by the association rule mining literature. In association rules, the support of a rule X→Y is the fraction of tuples that match both the antecedent and the consequent and the confidence is the fraction that match both divided by those matching the antecedent [2]. Note that there is no notion of multi-tuple violations in association rules, only single-tuple violations; and no notion of global support (respectively, confidence), only local support.

While detecting individual tuples that violate a CFD has been studied in [4, 9], and concisely representing anomalies in hierarchical aggregates was discussed in [1, 20], we are not aware of previous work on the concise summarization of constraint violations that our fail tableau provides. Our proposed range tableau is inspired by Extended Conditional Functional Dependencies (eCFDs) [5], which support disjunction and negation in patterns. Ranges are an interesting special case in which the set of disjuncts contains only contiguous values, and whose description length is independent of the size of the set. Although ranges have not been studied before in the context of FDs, they have been used to discover richer kinds of associations in so-called quantitative association rule mining [21].

The area of data cleaning deals with many issues that are outside the scope of our work, including missing data, erroneous values and (approximate) duplicates. Employing CFDs that hold (exactly or approximately) is merely one among an array of tools, including record linkage, deduplication, etc., that should be marshaled to detect data quality problems.

Conclusions

Data quality and undocumented semantics are serious issues in today's complex databases. Tools like CFDs, that have the potential to capture the semantics of the data and identify possible data quality problems, are of significant importance.

In this paper, we showed how to realize the full potential of CFDs by (a) formally defining the "goodness" of pattern tableaux, based on the desirable properties of support, confidence and parsimony, and (b) studying the computational complexity of automatic generation of optimal tableaux and providing an efficient approximation algorithm. We also proposed two extensions of pattern tableaux that can be accommodated by our algorithm: fail tableaux to compactly capture "anomalies" in the data with respect to a given CFD, and range tableaux that offer greater expressivity (and hence more parsimony) for ordered attributes. Experiments on real data sets demonstrated the utility and efficiency of our solutions.

The notion of conditioning integrity constraints on subsets of the relation is very appealing and has wide scope beyond functional dependencies, to inclusion dependencies [5], keys and "semi-keys" (see [22]). Automatic generation of tableaux will play an important role in these contexts.

REFERENCES

[1] D. Agarwal, D. Barman, D. Gunopulos, N. Young, F. Korn, and D. Srivastava. Efficient and effective explanation of change in hierarchical summaries. In *KDD, pp* 6-15, 2007.

[2] R. Agrawal, T. Imielinski, and A. Swami. Mining association rules between sets of items in large databases. In *SIGMOD*, pp 207-216, 1993.

[3] P. Berman and M. Karpinski. On Some Tighter Inapproximability Results (Extended Abstract). In *ICALP*, pp. 200-209, 1999.

[4] P. Bohannon, W. Fan, F. Geerts, X. Jia, and A. Kementsietsidis. Conditional functional dependencies for data cleaning. In *ICDE,* 2007.

[5] L. Bravo, W. Fan, and S. Ma. Extending dependencies with conditions. In VLDB, 2007.

[6] P. Brown, P. Haas. BHUNT: Automatic Discovery of Fuzzy Algebraic Constraints in Relational Data. In *VLDB,* 2003.

[7] T. Calders, R. Ng, and J. Wijsen. Searching for dependencies at multiple abstraction levels. *TODS,* 27(3):229-260, 2002.

[8] S. Ceri, F. D. Guinta, and P. Lanzi. Mining constraint violations. *TODS,* 32(1), 2007.

[9] G. Cong, W. Fan, F. Geerts, X. Jia, and S. Ma. Improving data quality: consistency and accuracy. In *VLDB,* 2007.

[10] M. Dalkilic and E. Robertson. Information dependencies. In *PODS, pp* 245-253, 2000.

[11] R. Gandhi, S. Khuller, and A. Srinivasan. Approximation algorithms for partial covering problems. *J. Algorithms,* 53(1):55-84, 2004.

[12] M. R. Garey and D. S. Johnson. *Computers and Intractability: A Guide to the Theory of NP—Completeness.* Freeman, San Francisco, 1979.

[13] C. Giannella and E. Robertson. On approximation measures for functional dependencies. *Information Systems,* 29(6):483-507, 2004.

[14] Y Huhtala, J. Karkkainen, P. Porkka, and H. Toivonen. Tane: An efficient algorithm for discovering functional and approximate dependencies. *The Computer Journal,* 42(2): 100-111, 1999.

[15] I. Ilyas, V Markl, P. Haas, P. Brown, and A. Aboulnaga. Cords: Automatic discovery of correlations and soft functional dependencies. In *SIGMOD, pp* 647-658, 2004.

[16] M. J. Kearns and U. V. Vazirani. *An introduction to computational learning theory*. MIT Press, 1994.

[17] R. King and J. Legendre. Discovery of functional and approximate functional dependencies in relational databases. *Journal of Applied Mathematics and Decision Sciences,* 7(1):49-59, 2003.

[18] J. Kivinen and H. Mannila. Approximate inference of functional dependencies from relations. *Theor Comput. Sci.,* 149(1):129-149, 1995.

[19] U. Nambiar and S. Kambhampati. Mining approximate functional dependencies and concept similarities to answer imprecise queries. In *WebDB,* 2004.

[20] S. Sarawagi. Explaining differences in multidimensional aggregates. In *VLDB, pp* 42-53, 1999.

[21] R. Srikant and R. Agrawal. Mining quantitative association rules in large relational tables. *SIGMOD Rec.,* 25(2): 1-12, 1996.

[22] Y Xu and R. Motwani. Random sampling based algorithms for efficient semi-key discovery. *Stanford University Technical Report.*

Appendix

Let dom(R) be a relation on schema R with N=|dom(R)| tuples. Let the size of a tableau be defined as the number of its pattern rows.

Recall from Definition 1 that TABLEAU GENERATION FOR GLOBAL SUPPORT AND GLOBAL CONFIDENCE, abbreviated TABLEAU GENERATION-GG, is this problem: Given an FD R: X→Y on a relation schema R with instance dom(R), and bounds S and c, find a pattern tableau T of smallest size such that the CFD (R: X→Y, T) has global support at least S and global confidence at least ĉ, if one exists, and return "infeasible" otherwise.

We also need the following similar definition.

Definition 4 TABLEAU EXISTENCE FOR GLOBAL CONFIDENCE AND GLOBAL SUPPORT, abbreviated as TABLEAU EXISTENCE-GG, is this problem: Given an FD R: X→Y on a relation schema R with instance dom(R), and bounds ŝ and ĉ determine if a pattern tableau T exists, of any size, which has global support at least ŝ and global confidence at least ĉ.

In order for TABLEAU GENERATION-GG to be a reasonable optimization question, we need TABLEAU EXISTENCE-GG to be polynomially solvable. In fact, it is.

Theorem 1 There is a polynomial-time algorithm for TABLEAU EXISTENCE-GG.

Proof. Given an input to TABLEAU EXISTENCE-GG, if there is a feasible tableau T, then there is one, called T', all of whose rows are "fully instantiated," i.e., have no wildcards in the antecedents: just let T' be the tableau which has one row for each distinct database row r which matches some pattern in T. Of course, if there is no feasible tableau, then there is also no feasible tableau of fully instantiated rows. So as far as existence (but not optimization) goes, we can determine if there is a tableau of fully instantiated rows which satisfies the support and confidence thresholds.

We can solve this problem via dynamic programming. First compute the local support $s_r$ and number of keepers $k_r$ for each distinct antecedent r which appears in the database. For any $0 \leq l \leq n$ (n being the number of distinct antecedents) and any S, $0 \leq S \leq \Sigma_{r=1}^{n} s_r$, define f(l,S) to be the maximum value of $\Sigma_{i \in T} k_i$ over all subsets T of $\{1, 2, \ldots, l\}$ with $\Sigma_{i \in T} s_i = S$, and $-\infty$ if no suitable T exists. In words, it is the maximum sum of keepers associated with covers of the first l distinct rows whose sum of local supports is exactly S. We have f(0, 0)=0 and f(0, S)=$-\infty$ for all S≠0.

Now the key recurrence is that f(l+1, S) is the maximum of (possibly) two quantities: f (l, S), and f(l, S$-s_{l+1}$)+$k_{l+1}$ if $s_{l+1} \leq S$.

Using this recurrence we calculate f(l, S) for all l=0, 1, 2, . . . , n and S=0, 1, 2, . . . , $\Sigma_{r=1}^{n} s_r$ in time O(nN). Once we have these values, we return "feasible" if there is an S≥ŝ with f(n, S)/S≥ĉ and "infeasible" otherwise.

We will show that not only is TABLEAU GENERATION-GG NP-Hard, it is provably hard to approximate (unless P=NP). Specifically, if there are an ε>0 and a polynomial-time algorithm that takes, for any N, an N-row database D as input, and returns "infeasible" if TABLEAU EXISTENCE-GG is infeasible, and otherwise returns a feasible tableau whose size is at most the size of the optimal tableau times $N^{1/2-\epsilon}$, then P=NP.

Definition 5 Given a graph G=(V, E), we say a vertex v covers an edge e iff v∈e (viewing an edge as a set of size two). A set S of vertices covers a set F of edges if each edge in F is covered by some vertex in S. VERTEX COVER is the problem of finding in G a smallest subset S of V that covers E.

Definition 6 A tripartite or 3-colorable graph is one in which the vertex set V can be partitioned into three sets such that each edge has its endpoints in two different sets.

Definition 7 VERTEX COVER IN TRIPARTITE GRAPHS, which we abbreviate VC3P, is the problem of finding a smallest vertex cover in a tripartite graph (with a given tripartition).

It is known (see [12]) that finding a smallest vertex cover in a tripartite graph is NP-Hard. We will also assume that the tripartition is always explicitly given.

We will prove the following nonexistence theorem.

Theorem 2 If there are a polynomial-time algorithm A and a constant $\epsilon > 0$ such that, for all N, A returns a feasible solution to TABLEAU GENERATION-GG (when TABLEAU EXISTENCE-GG is feasible) of size at most $N^{1/2-\epsilon}$ times optimal, N being the number of rows of the input database, then P=NP.

We will prove Theorem 2 by proving two lemmas. But first, we need another definition. Let us denote the minimum size of a vertex cover in graph G by $r(G)$. Suppose we instead define a variant:

Definition 8 We say that an edge e' covers an edge e iff e'=e. A vertex-edge cover in a graph $G=(V, E)$ is a pair $(S, F)$, $S \subseteq V$, $F \subseteq E$, such that every e in E is covered either by a v in $\overline{S}$ or an e' in F. Its size is $|S|+|F|$.

Then VERTEX-EDGE COVER MINIMIZATION, abbreviated as VE COVER, is the problem of finding the smallest vertex-edge cover of a graph G. Restricted to tripartite graphs, we call the problem VE3P.

One would never really study such a problem. Why would one use an edge e' to cover an edge $e=\{u, v\}$, if one could take either u or v instead? Both endpoints cover e and may cover other edges as well, so it would seem stupid to choose e'=e to cover e, when, for the same, price, one could choose a vertex which covers the same edge and maybe more.

Nonetheless, one can ask the following question. It is known that there is a 2-approximation algorithm for VERTEX COVER, the problem of covering the edge set by vertices. This means that one can use two sets of vertices, each of size at most $r(G)$, to cover E. What if one is allowed to use, for VERTEX COVER, only $\tau(G)$ vertices, but, in addition, some number of edges?

Definition 9 A restricted $n^{1-\epsilon}$-approximation algorithm for VE3P is a polynomial-time algorithm A which takes a tripartite graph G on say, n vertices, and a positive integer l as input, and if $\tau(G) \leq l$ then A returns a vertex-edge cover $(S, F)$ for G in which $|S| \leq l$ and $|F| \leq l(n^{1-\epsilon})$. (If $\tau(G) > l$, then the algorithm can return anything. It just must terminate in polynomial time.)

Note that the algorithm can't "cheat" on the size of S. S must have size at most l. Since one can find a vertex cover by using only $\tau(G)$ additional vertices, it is interesting to see what power additional edges buys. (Not much, it turns out.)

Lemma 3 If there are a $\delta > 0$ and a restricted $n^{1-\delta}$-approximation algorithm B for VE3P, then there is a polynomial-time algorithm for VC3P, and hence P=NP In other words, edges are basically worthless for covering edges. You have to take way too many. Additional vertices are much more valuable.

Lemma 3 is one of the two lemmas needed to prove Theorem 2. The other one is Lemma 4.

Lemma 4 If there are an $\epsilon > 0$ and a polynomial-time algorithm A that takes a database with, say, N rows, and bounds ĉ and ŝ, and produces a feasible tableau whose size is at most $N^{1/2-\epsilon}$ times the size of the smallest tableau satisfying the given support and confidence bounds (when TABLEAU EXISTENCE-GG is feasible), for all N, then there is a restricted $n^{1-2\epsilon}$-approximation algorithm for VE3P.

Lemmas 3 and 4 together clearly imply Theorem 2. We start with the proof of Lemma 4. Proof. Suppose that $\epsilon > 0$ and that A is a polynomial-time algorithm that takes, for all N, a database D with N rows, ĉ, and ŝ, and produces a tableau whose size is at most $N^{1/2-\epsilon}$ times the size of the optimal tableau (when TABLEAU EXISTENCE-GG is feasible). We show how to build a restricted $n^{1-2\epsilon}$-approximation algorithm for VE3P.

Given an instance of VE3P, i.e., a tripartite graph $G=(V, E)$ on n vertices, V partitioned into $(A, B, C)$, and an integer l, build an instance of TABLEAU EXISTENCE-GG as follows.

Fix two new constants $d \neq d'$. For each edge $\{a_i, b_j\}$, with $a_i \in A$, $b_j \in B$, add a row $(a_i, b_j, c_{a_i,b_j} | d)$, d being the consequent, to the database, where $c_{a_i,b_j}$ is some new constant appearing nowhere else in the database. Notice that the local support and keeper count of antecedent $(a_i, b_j, c_{a_i,b_j})$ are both 1. Analogously, for each edge $\{b_j, c_k\}$, with $b_j \in B$, $c_k \in C$, add a row $(a_{b_j,c_k}, b_j, c_k | d)$ to the database, where $a_{b_j,c_k}$ is some new constant appearing nowhere else in the database, and for each edge $\{a_i, c_k\}$, with $a_i \in A$, $c_k \in C$, add a row $(a_i, b_{a_i,c_k}, c_k | d)$ to the database, where $b_{a_i,c_k}$ is some new constant appearing nowhere else in the database.

For each vertex $a_i \in A$ in the database, add two rows, $(a_i, b_{a_i}, c_{a_i} | d)$ and $(a_i, b_{a_i}, c_{a_i} | d')$, to the database, where $b_{a_i}$ and $c_{a_i}$ are new constants. Notice that the local support and keeper count of antecedent $(a_i, b_{a_i}, c_{a_i})$ are 2 and 1, respectively. Do the analogous thing for vertices $b_j \in B$ and $c_k \in C$.

Set the target global support bound ŝ to be m+2l, m being the number of edges in the tripartite graph G, and the target global confidence bound ĉ to be $(m+l)/(m+2l)$. This completes the construction of the TABLEAU EXISTENCE-GG instance.

It is easy to verify the following fact.

Fact 5 Any feasible solution T to this instance of TABLEAU EXISTENCE-GG must have Cover(T, D) (the set of rows of D covered by patterns in T) equal to the set of all m database rows corresponding to the set E of edges, together with exactly 2l database rows corresponding to the pairs associated with some set of l vertices, and no others.

Which tableaux can achieve this? Since we may assume that all consequents in such a tableau are wildcards, for the remainder of the paper we look only at the antecedents. Say a tableau row corresponds to a vertex if it is either $(a_i, —, —)$ for some $a_i \in A$, or $(—, b_j, —)$ for some $b_j \in B$, or $(—, —, c_k)$ for some $c_k \in C$. There may be tableau rows, even with exactly two wildcards, such as $(—, —, c_{a_i,b_j})$, which do not correspond to vertices. Similarly, say a tableau row corresponds to an edge if it is either $(a_i, b_j, —)$ for some $a_i \in A$, $b_j \in B$ with $\{a_i, b_j\} \in E$, or $(a_i, —, c_k)$ for some $a_i \in A$, $c_k \in C$ with $\{a_i, c_k\} \in E$, or $(—, b_j, c_k)$ for some $b_j \in B$, $c_k \in C$ with $\{b_j, c_k\} \in E$. There may be tableau rows, even with exactly one wildcard, such as $(a_i, —, c_{a_i,b_j})$, which do not correspond to edges.

We prove that any suitable tableau T can be converted to one, called T', of size no greater, with global confidence at least as high as that of T, and for which cover(T', D) $\supseteq$ cover(T, D), and hence global support at least as high as that of T.

First, no row of T can be $(—, —, —)$, for such a tableau has global confidence too small. (This requires assuming that l<n.)

Now let's consider rows of T with exactly two wildcards. By symmetry, we may assume they appear in positions 2 and 3. Any such row which covers at least one row of the database is either of the form $(a_i, —, —)$ (which corresponds to a vertex), or $(a_{b_j,c_k}, —, —)$, or $(a_{b_j}, —, —)$, or $(a_{d_k}, —, —)$. The row $(a_{b_j,c_k}, —, —)$ covers only the row $(a_{b_j,c_k}, b_j, c_k)$ of the database, so can be replaced by $(—, b_j, c_k)$, which corresponds to an edge, in the tableau. Row $(a_{b_j}, —, —)$ covers only the two rows having antecedent $(a_{b_j}, b_j, c_{b_j})$ in the tableau. Replacing it by $(—, b_j, —)$ covers the same two "node" rows of the database and more "edge" rows of the database, but, by Fact 5, they were already covered anyway. Similarly, row $(a_{c_k}, —,$ —) covers only row $(a_{c_k}, b_{c_k}, c_k)$ of the tableau. Replacing it by (—, —, $c_k$) covers the same one "node" row of the database and more "edge" rows of the database, but, by Fact 5, they were already covered anyway.

Now let's consider rows of T with exactly one wildcard. By symmetry, we may assume the wildcard appears in position 3. Any such row which covers at least one row of the database is either of the form $(a_i, b_j, —)$ (which corresponds to an edge); or $(a_i, b_{a_i,c_k}, —)$ or $(a_{b_j,c_k}, b_j, —)$; or $(a_i, b_{a_i}, —)$, or $(a_{b_j}, b_j, —)$; or $(a_{c_k}, b_{c_k}, —)$.

Rows $(a_i, b_{a_i,c_k}, —)$ and $(a_{b_j,c_k}, b_j, —)$ are symmetric so we just discuss the first case. Row $(a_i, b_{a_i,c_k}, —)$ covers only the one database row with antecedent $(a_i, b_{a_i,c_k}, c_k)$ so it can be replaced by "edge" tableau row $(a_i, —, c_k)$.

Rows $(a_i, b_{a_i}, —)$ and $(a_{b_j}, b_j, —)$ are symmetric so we just discuss the first case. Row $(a_i, b_{a_i}, —)$ covers only the two database rows with antecedent $(a_i, b_{a_i}, c_{a_i})$, so can be replaced by "vertex" tableau row $(a_i, —, —)$.

Last, we have row $(a_{c_k}, b_{c_k}, —)$, which covers only the two database rows with antecedent $(a_{c_k}, b_{c_k}, c_k)$, so can be replaced in the tableau by (—, —, $c_k$).

Now we consider tableau rows with no wildcards. Each such row already appears in the database. If it is an "edge" row, $(a_i, b_j, c_{a_i,b_j})$, replace it by $(a_i, b_j, —)$. Do the analogous thing for other edge rows. If it is a "vertex" row $(a_i, b_{a_i}, c_{a_i})$, or some variant of this, replace it in the tableau by $(a_i, —, —)$.

So we may assume that each row of the tableau is either a "vertex" row $(a_i, —, —)$ (or the symmetric one with $b_j$ or $c_k$) or an "edge" row $(a_i, b_j, —)$ (or a symmetric one).

Run the $N^{1/2-\epsilon}$-approximation algorithm A for TABLEAU GENERATION-GG on database D derived from the instance of VE3P. We may assume that the result is a tableau having only vertex and edge rows. In fact, it must have at most l vertex rows (as otherwise the global confidence bound would be violated).

If $\tau(G) \leq l$, then G has a vertex cover of size l. This means that there is a tableau T of size l using only vertex rows which satisfies the global support and confidence thresholds. Since the approximation algorithm returns an $N^{1/2-\epsilon}$ approximation, it must return at most $l(N^{1/2-\epsilon})$ rows altogether, and hence at most $l(N^{1/2-\epsilon})$ edge rows. If the number |S| of vertex rows exceeded l, then it would violate the global confidence bound. Hence |S|≤l. Together, the vertex and edge rows of the tableau must cover all the edge rows of the database. It follows that each edge of the tripartite graph G is covered either by a vertex or an edge in the tableau. Hence, we have a VE cover (S, F) of E, with |S|≤l and |F|<$l(N^{1/2-\epsilon})$.

Any n-node graph has at most $(\frac{1}{2})n^2$ edges. It follows that $N \leq 2n + (\frac{1}{2})n^2 \leq n^2$ (we may assume n≥4). This means that |F|≤$l(n^2)^{1/2-\epsilon} \leq l(n^{1-2\epsilon})$, and hence that the algorithm is a restricted $n^{1-2\epsilon}$-approximation algorithm for VE3P.

Now we must prove Lemma 3.

Proof. Suppose algorithm B is a polynomial-time, restricted $n^{1-\delta}$-approximation algorithm for VE3P. From B we will construct an exact polynomial-time algorithm for VC3P. Given a tripartite graph G and an integer k, choose a large integer r whose value will be defined later. Build graph H by replacing each vertex $v \in V(G)$ by a cluster C(v) of r independent vertices; replace each edge $\{u, v\}$ in G by a complete bipartite graph between $C_u$ and $C_v$. Like G, H is tripartite. A folklore fact is that $\tau(H) = r\tau(G)$:

Fact 6 $\tau(H) = r\tau(G)$.

Proof. The size a(H) of the largest independent set in H is exactly r times the size a(G) of the largest independent set in C, for the following reason. Given any independent set S in G, the union of $C_v$ over $v \in S$ is independent in H, and given any independent set in H, we can enlarge it to include all vertices of any $C_v$ of which it contains at least one, and then "retract" it to an independent set in G.

Now $\tau(H) = nr - a(H) = nr - ra(G) = r(n - a(G)) = r\tau(G)$.

Run algorithm B on tripartite graph H; provided that r is bounded by a polynomial in n, B will run in polynomial time in n. If $\tau(G) \leq l$, then $\tau(H) \leq rl$ and hence B returns a set Z' of vertices of H, of size at most rl, together with a set of at most $M := (rl)(nr)^{1-\delta}$ edges (rl being an upper bound on $\tau(H)$ and nr being the number of vertices in H), such that Z' covers all but at most M edges of H. Let $Z \subset V$ be the set of vertices v such that $C_v \cap Z'$ has size at least $r - \sqrt{M+1}$. Here is another simple fact:

Fact 7 Z is a vertex cover of G.

Proof. If not, then there is an edge $\{u, v\}$ of E(G) such that u, v ∉ Z. Hence, $|C_u \cap Z'|$ and $|C_v \cap Z'|$ are both strictly less than $r - \sqrt{M+1}$. Since all possible edges between $C_u$ and $C_v$ exist in H, Z' fails to cover at least $(\sqrt{M+1})^2 = M+1$ edges, contradicting the definition of Z'. □

Algorithm B found at most rl vertices in H in its VE cover Z' of H. The size of the vertex cover Z given by Fact 7 is then at most $(rl)/(r - \sqrt{M+1}) = l/(1 - \sqrt{M+1/r^2})$.

Now are virtually done. The parameter r must be polynomial in n, so that the resulting algorithm runs in polynomial time, but need obey no other constraint. It is now a simple matter to choose an r which is polynomial in n (for fixed δ>0) such that for any value of l, $1 - \sqrt{M+1/r^2} > l/(l+1)$. (We need $l/(1 - \sqrt{(rl(nr)^{1-\delta})/r^2}) \leq l+1$, that is, $\sqrt{(rl(nr)^{1-\delta})/r^2} \leq 1/(l+1)$. It is sufficient to obtain $\sqrt{(rl(nr)^{1-\delta})/r^2} < 1/(n+1)$, or $$\frac{rn(nr)^{1-\delta}}{r^2} < 1/(n+1)^2,$$

or $n^{2-\delta} r^{-\delta} < 1/n^2$, or $n^{4-\delta} < r^\delta$, or $$r > n^{\frac{4-\delta}{\delta}}.)$$

This means that Z is a vertex cover of G of size at most l. Now just try all values of l and output the smallest vertex cover found. When $l = \tau(G)$, we will find a smallest vertex cover of G.

The foregoing merely illustrates the principles of the invention. Those skilled in the art will be able to devise various alternative implementations which, even if not shown or described herein, embody the principles of the invention and thus are within their spirit and scope.

The invention claimed is:

1. A method for use by a computer for automatically generating a pattern tableau of a conditional functional dependency of a relation instance, the method comprising steps performed by the computer of:
   (a) adding an individual pattern to the tableau;
   if that pattern has;
   (i) the highest support from among a plurality of candidate tableau patterns;
   (ii) a confidence that is greater than or equal to a local confidence threshold ĉ, this step being carried out based on a determined cover, determined local support and a determined local confidence of each of the plurality of candidate patterns; and
   (b) repeating step a) until the global support of the tableau is at least equal to a global support threshold;

wherein in the steps (a) and (b):
(i) each of said patterns is a tuple having at least one antecedent attribute and at least one consequent attribute;
(ii) a cover of a pattern is a row of the relation instance having a tuple that matches the antecedent of that pattern;
(iii) the local support of a pattern is a fraction of tuples of the relation instance that are covers of that pattern;
(iv) the local confidence of a pattern is a ratio of its keepers to its covers, the keepers of a pattern being the number of its covers determined after removing from the relation instance the fewest rows needed to eliminate all disagreements between the consequent of the pattern and the consequents of the tuples of the remaining row;
(v) the global support of a tableau is the fraction of the tuples of the relation instance covered by at least one of the patterns of the tableau; and
(vi) and the tuples of iii) and iv) are tuples that are not covers of patterns already chosen for the tableau; and
wherein the conditional functional dependency is composed of an embedded functional dependency (FD) X→Y in combination with the pattern tableau, where X and Y are subsets of a relational schema for the relation instance, the relation instance comprising a plurality of tuples having attributes, and wherein, in accordance with the functional dependency (FD) X→Y, any two of the tuples that agree on the values of all the attributes in subset X must agree on the values of all the attributes in subset Y;
wherein the pattern tableau defines a subset of the tuples of the relation instance for which the embedded functional dependency holds;
wherein the plurality of candidate tableau patterns is initially a single pattern that matches every tuple of the relation instance;
wherein the method further comprises the computer adding a child of a pattern to the plurality of candidate tableau patterns when all of the parents of that child have been determined to meet criterion (a)(i) but not criterion (a)(ii);
wherein the child of a parent pattern is one in which in which exactly one match-all attribute in the parent pattern is replaced with an attribute constant that appears in the relation instance; and
wherein a parent of a child pattern is a pattern in which exactly one attribute constant in the child pattern is replaced with a match-all attribute.

* * * * *